United States Patent [19]

Nance et al.

[11] 4,008,378
[45] Feb. 15, 1977

[54] MULTI-RADIX DIGITAL COMMUNICATIONS SYSTEM WITH TIME-FREQUENCY AND PHASE-SHIFT MULTIPLEXING

[75] Inventors: W. Franklin Nance, Orange; Robert L. Shacklett, Fresno, both of Calif.

[73] Assignee: NS Electronics, Fresno, Calif.

[22] Filed: Mar. 17, 1975

[21] Appl. No.: 559,127

Related U.S. Application Data

[63] Continuation-in-part of Ser. No. 359,864, May 14, 1973, Pat. No. 3,872,255.

[52] U.S. Cl. .................................. 179/15 A; 325/30
[51] Int. Cl.² ........................................ H04L 27/10
[58] Field of Search ............ 179/2 R, 2 DP, 15 BS, 179/15 A; 178/50, 67.66, 69.5 R; 325/30, 39, 40; 340/207 R, 207 P, 348, 351

[56] References Cited

UNITED STATES PATENTS

| | | | |
|---|---|---|---|
| 3,128,343 | 4/1964 | Baker | 178/67 |
| 3,524,023 | 8/1970 | Whang | 179/2 DP |
| 3,667,046 | 5/1972 | Schoolcraft | 178/67 X |
| 3,816,657 | 6/1974 | Fletcher | 325/30 X |

Primary Examiner—Benedict V. Safourek
Attorney, Agent, or Firm—Gregg, Hendricson, Caplan & Becker

[57] ABSTRACT

A communication or data transmission system having one or more transmitters placing input signals in digital pulse form if they are not already in such form, storing and time stretching of such pulses, conversion of the pulses into time-frequency matrix addresses and phase shifting each of a set of RF carriers within given time slots to one of a predetermined number of phase angles during each time frame for transmittal to maximize the number of bits of information that can be transmitted in a given bandwidth and minimizing transmission errors. Receivers connected to the transmitters by a transmission medium, such as a telephone cable, reverse the processing of the transmitters.

6 Claims, 15 Drawing Figures

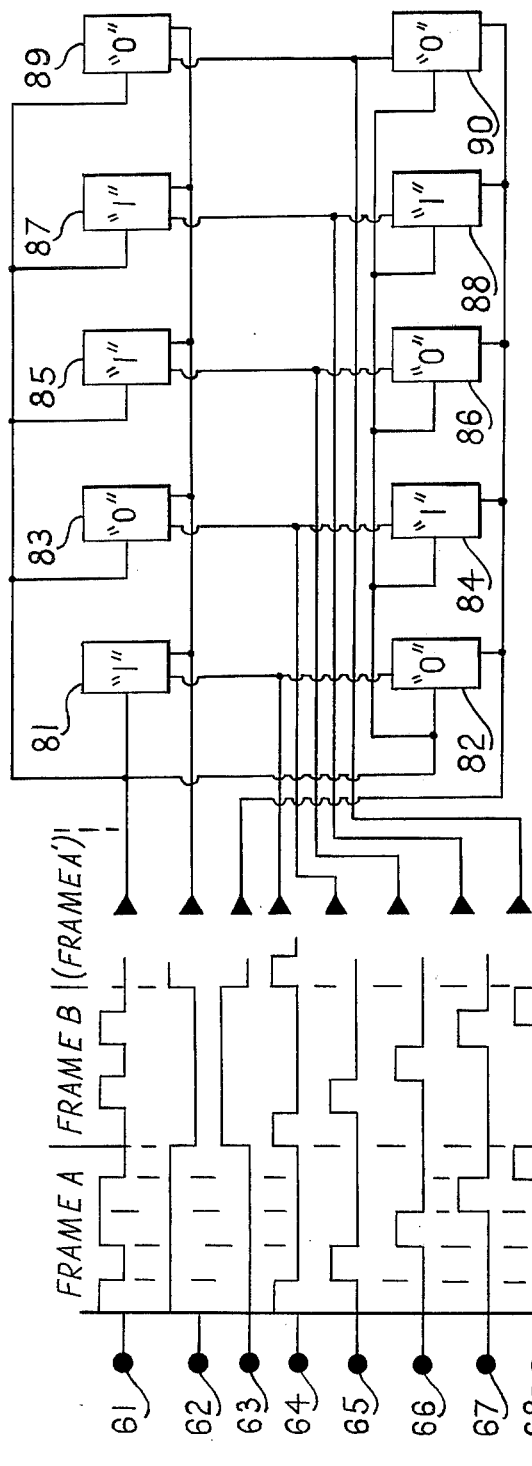
FIG. 3A
FIG. 3B

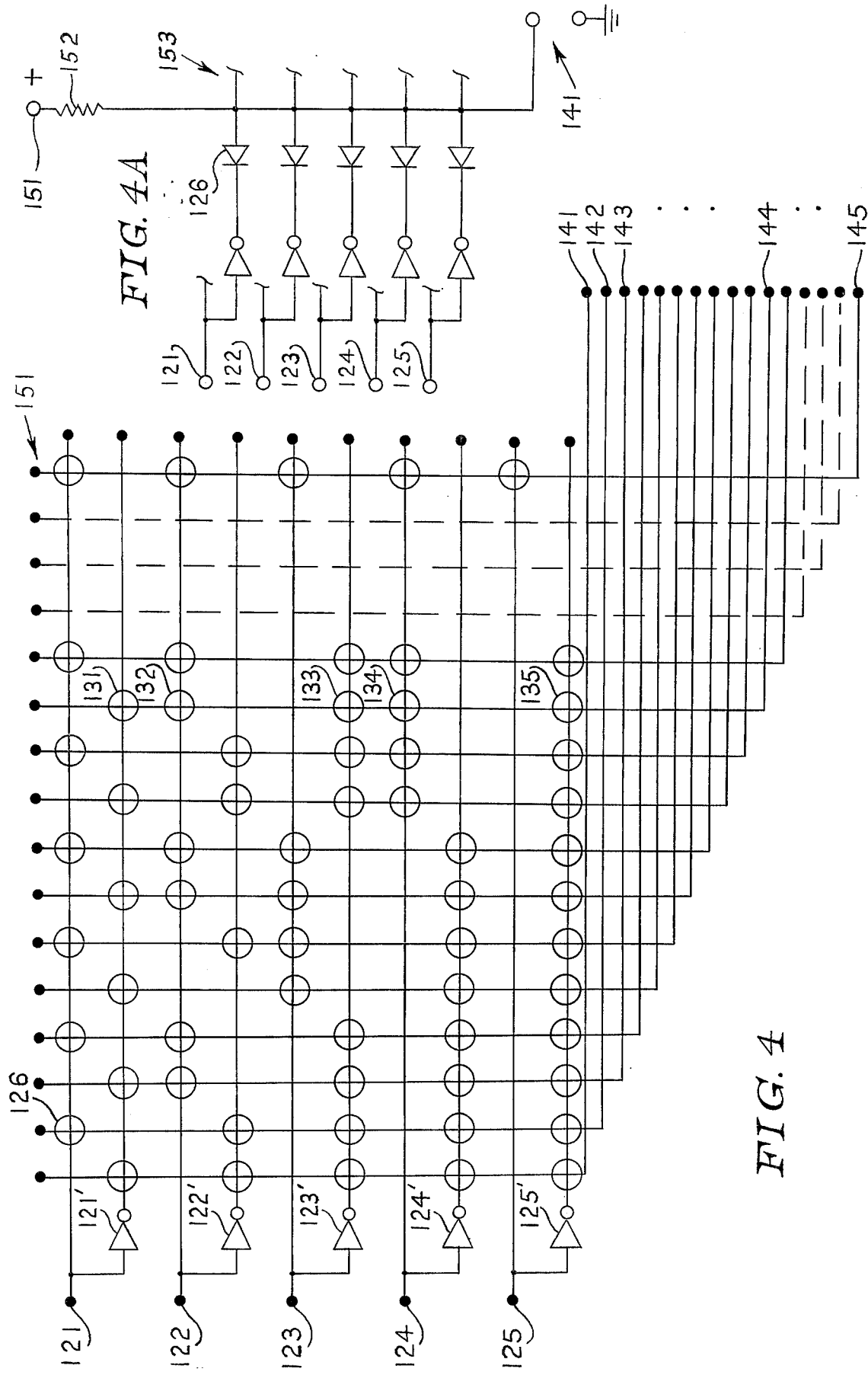

MULTI-RADIX DIGITAL COMMUNICATIONS SYSTEM WITH TIME-FREQUENCY AND PHASE-SHIFT MULTIPLEXING

This is a continuation-in-part of our co-pending U.S. Pat. application Ser. No. 359,864 filed in the U.S. Patent Office on May 14, 1973 and entitled "Digital Communications System with Time-Frequency Multiplexing" which issued as U.S. Pat. No. 3,872,255 on Mar. 18, 1975.

BACKGROUND OF INVENTION

In order to provide a greater number of users access to the same communication medium, a variety of multiplexing techniques have been devised. The two principal techniques are known as frequency division multiplexing (FDM) and time division multiplexing (TDM). Applications of FDM and TDM in the telephone industry have made possible the use of two pairs of wires by as many as 24 and more users simultaneously. Attempts to capitalize on the small probability that all users of a TDM system are "off hook" at the same time have led to the use of switching devices called concentrators. These devices, one located in the central office and the other usually located near a remote group of subscribers to be served, allow up to three or more times as many subscribers to have potential access to the central office as the TDM system (typically PCM, pulse code modulation) will actually handle at the same time (usually 24). Their disadvantage is that, in the improbable event that more than, say, 24 subscribers want access to the system, only the first 24 will be served; the others must wait until a free channel is available.

Because the narrow pulses used in TDM systems require a rather wide pass band for their faithful transmission, it is necessary to insert regenerative repeaters at specific locations along a cable to compensate for the high attenuation of the higher frequencies by the cable. Such repeaters generate a new pulse in place of each one detected at the input of the repeater. The detection process is hampered by a phenomenon known in the industry as "pulse jitter" and results in random errors in the pulse stream which show up as noise in the user's receiver.

A combination of FDM and TDM techniques (frequency-time division multiplexing, FTDM) is used in such systems as RADA (Random Access Discrete Address) and is the subject of several patents and articles. Information is communicated in these systems by means of an addressing scheme wherein bursts or pulses of RF energy are transmitted at specified frequencies and at specified moments of time. This addressing scheme can be better appreciated by using the concept of the frequency-time (FT) matrix which is an array of "holes" in the frequency-time domain, each hole being defined by a specified frequency and a specified time slot within a larger interval of time referred to as a time frame. An address consists of a set of two or more RF pulses which occupy predetermined holes in the FT matrix. Because of the large number of addresses which can be defined in this manner on the FT matrix, each bit of user information can be assigned a unique address.

FTDM systems employing this type of addressing are subject to the phenomenon of "false addressing" wherein addresses not intentionally transmitted are, nevertheless, received because RF pulses, produced by a multiplicity of users, randomly occupy hole combinations on the FT matrix which have been defined as user addresses. Such false addresses generate a noise background (self-interference noise) which increases rapidly as the number of users increases.

In improving the FTDM system of the present invention disclosed and claimed in the above-identified patent application, particularly as regards the reduction of self-interference noise, it was determined that the FT matrix has a much greater potential for information content than previously comtemplated. It is to be noted that present FTDM systems are based upon a two-valued or binary condition for each hole in the FT matrix, i.e., each hole has only the presence or absence of a pulse. The present invention takes advantage of this greater potential and additionally eliminates the problem of the self-interference noise. Furthermore, through a radix conversion process in accordance with the present invention, it is possible to concentrate more users into the system with no substantial increase in the required bandwidth and without diminishing the accessibility of users to the system as is the case with existing concentrators. Finally, the typical decision circuitry of TDM system receivers is based upon detection of narrow, noise-like pulses and, in the presence of normal noise, it is difficult for a receiver to distinquish between noise and legitimate pulses; thus, when noise accompanies the desired information, this TDM receiver output is likely to contain digital errors. The present invention significantly improves the decision margin by providing for the reception of several repeated events before the decision is made regarding the correct state. It is also noteworthy that TDM systems operating with telephone cable are susceptible to localized changes in cable characteristics which give rise to different propagation times for different frequencies resulting in pulse shape distortion. In the present invention the use of sinusoidal RF carriers in the FT matrix makes the system relatively immune to problems arising from cable abnormalities.

The greater potential for information content in an FT matrix as provided herein makes the present invention particularly adapted to very high speed data transmission.

Reference is made to the above-identified U.S. Pat. No. 3,872,255 of the present inventors and art cited in the prosecution thereof for an identification of prior art patents and publications in the field of the present invention and attention is also invited to the following: U.S. Pat. No. 3,806,655, U.S. Pat. No. 3,769,461 and Bell System Technical Journal, Vol. 53, No. 5, pages 867 to 936.

SUMMARY OF THE INVENTION

The present invention is applicable to various types of communication systems as well as data transmission systems; however, in the interest of clarity, the invention is described primarily with respect to a telephone communication system. It will, of course, be appreciated that analog-to-digital conversion of a voice communication system is not required in a data transmission system. Furthermore, in data applications it is to be noted that any data which can be represented by digital words (sets of digits) may be handled by the present system either in a serial (sequential) or parallel (concurrent) form.

A communication system in accordance with the present invention may comprise a plurality of transmitters and receivers each with access to a transmission medium, such as electromagnetic or optical paths, which can carry modulated signals. Each transmitter and receiver may serve a plurality of users and may be placed at different locations along the transmission medium. Each transmitter performs two main functions, with the first of these being a combined storing, time-stretching and readout of pulses representing information bits which arrive on user input lines. These pulses are generated in the transmitter typically either by delta modulators which are used to convert speech into digital form or by interfacing circuitry used in the case of data transmission. The second transmitter function is the processing of these time-stretched pulses so that one of a plurality of predetermined phase shifts is determined in each of the time slots of a time frame for an assigned RF carrier of a frequency-time (FT) matrix.

The description of the transmitter functions is simplified by making the address assignment for each user correspond to one time slot in a time frame of the FT matrix. The number of time slots in a time frame is represented by the symbol $p$. The receiver of the present method and system essentially reverses the functions of the transmitter, except for the phaseshift detector circuits which provide a redundancy in the identification of the received phase. Storage, stretching and readout of user input information bits or pulses is herein accomplished by time-gating the input pulses into $q$ separate storage registers, where $q$ is an integer designating the number of information bits or pulses within a time frame, where a set of time intervals occurring sequentially comprises a time frame. In a given first time frame, these pulses are gated into a first set of storage registers. In the following second time frame the inputs to this first set of registers are inhibited and the register outputs are enabled. A second set of registers receives the pulses in the second time frame while the first set of stored pulses is being read out. These two sets of registers reverse their roles during alternate time frames. The shorter input pulse of each information bit period is, in this manner, stored throughout the entire time of the next frame and is thereby "stretched" for readout. The outputs of the pair of registers associated with one of the $q$ bits are tied together to form a single output line with the total number of output lines equal to $q$, and each having present on it a pulse or absence of pulse with duration equal to the period of the time frame.

These stretched pulses are then typically processed through a set of $p$ AND matrices, each of which produce a true condition on one of $2^q$ matrix output lines. The quantity $2^q$ is the number of different binary combinations that can be produced by an AND matrix from pulses or absences of pulses on the $q$ matrix input lines. Depending on the type of user input signals, some of the $2^q$ combinations may be sufficiently improbable so that it may not be necessary to provide output lines for every one of the combinations. Assume that the number of output lines of one AND matrix is $m$ where $m \leq 2^q$. The true condition of one of these m lines, which lasts for the entire frame, is gated to a phase shifter whose phase bears a fixed relationship to the particular state represented by this true condition. The duration and timing of the gate is in accordance with the assignment of that particular user to one of the $p$ time slots in the time frame. The phase shifter controls the phase of an RF carrier whose frequency has been assigned to this particular set of $p$ users.

There is a direct correspondence between the information transmitted in each of the $p$ time slots with m different phase-shift values for each time slot, and a p-place digital word (or number) with radix $m$. This correspondence provides a particularly useful means for effecting a radix conversion which allows for a system expansion, if desired, utilizing the same FT matrix and with no substantial increase in bandwidth.

The method and system of the present invention allow for portions of the transmitter and receiver units also to serve as regenerative repeaters. The receiver detects the phase shift level in each time slot. Using the detected information the local transmitter reconstructs a new RF carrier, synchronized with the received carrier, and phase shifted by the proper amounts.

For data transmission the input pulses would be applied to the storage portion as briefly described above. In both voice and data transmission there is transmitted herein several cycles of phase shifted carrier per time slot and thus the system provides for a number of opportunities for the detection of the value of the phase shift. Decision circuitry is employed in the receiver which takes advantage of this feature and thereby greatly reduces the probability of noise at the output due to incorrectly detected phase shifts.

DESCRIPTION OF FIGURES

The present invention is illustrated as to a single preferred embodiment thereof in the accompanying drawings, wherein:

FIGS. 3A and 3B are illustrations of waveforms at indicated portions of the circuit of FIG. 3;

FIG. 4 is a circuit diagram of the AND matrix of FIG. 2;

FIG. 4A is a wiring diagram of a portion of the matrix of FIG. 4;

DESCRIPTION OF PREFERRED EMBODIMENT

Figure 1:
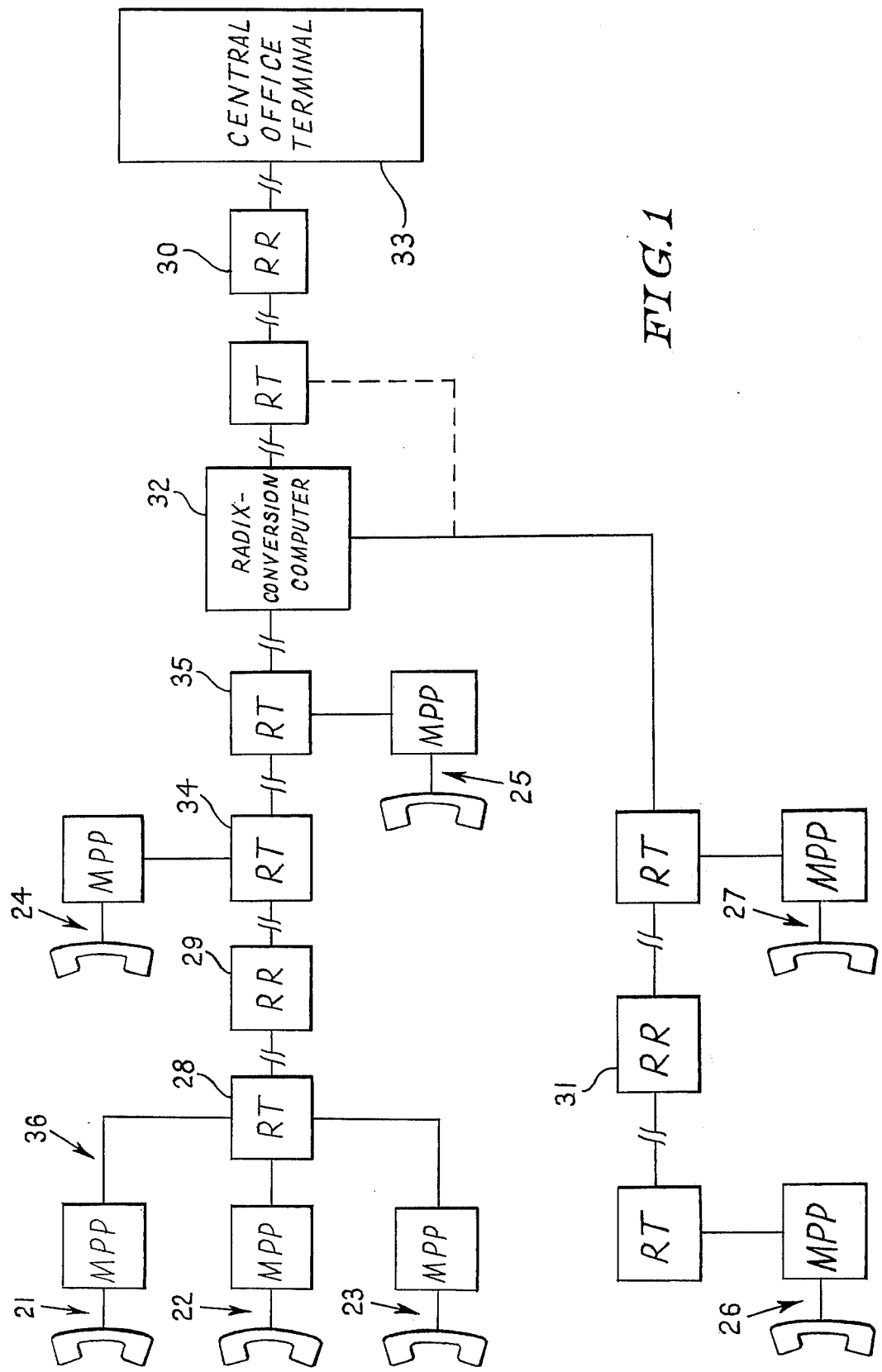
FIG. 1 is a block diagram of an overall telephone communications system illustrating the basic components of the present invention.

A telephone communication system in accordance with the present invention is adapted to operate with a substantial number of users; however, in order to clarify the description, the drawings are limited to the illustration of a small number of user input lines in order to avoid redundant illustration. Referring now to FIG. 1 of the drawings, there is shown an overall block diagram of a typical application of the communication system of this present invention which depicts a plurality of user inputs in the form of telephone voice signals. In this application such users are ordinarily at different locations and, in order to illustrate the versatility of the present invention, the following description is confined to this configuration. However, it is to be noted that the invention also lends itself to either uni- or bi-directional point-to-point communication where all user signals feed into the same common equipment. It is to be appreciated that the application of this communication system to telephone usage such as that depicted in FIG. 1, voice signals are typically sent in both directions. In the discussion of FIG. 1 and subsequent figures, emphasis is placed upon transmission of signals from the user to the central office terminal. Since the equipment needed to process the signals in the reverse direction is identical, no further description relating to equipment for this reverse path is included. Voice signal transducers (telephone sets) and their associated modulators and pulse processing units (MPP units) are shown at 21 through 27. The modulator section of each MPP unit is typically a delta modulator, but it is to be noted that the method and system of the present invention are not limited to this type of modulation since the analog-to-digital converters of other devices also provide signals in digital form. For this reason no further description of the modulator section of the MPP is included herein. The purpose of the pulse processing section of the MPP unit is to convert the sequential user signals in binary form and at a high bit rate into m-ary digital form at a lower rate. The pulse processing section is described further below in connection with FIGS. 2, 3, 4 and 6.

Again referring to FIG. 1, users at 21, 22 and 23 are connected to a single receive-transmit (RT) unit 28 illustrating one of several options for connecting users to the system. Other options are indicated by the connections at 24, 25, 26 and 27, and will be described below. In this description the term "module" refers to the common equipment consisting of a double RT unit as well as the individual MPP units which together serve a plurality of users such as indicated at 36. Additionally, it will be noted that the term "receive" implies a dual operation. One of these operations is the conventional one of detecting an RF signal and converting it to appropriate form for the user. The other operation is that of a receiver in a regenerative repeater (RR) wherein the detected signal is processed for immediate retransmission. Regenerative repeaters 29, 30 and 31 are shown in FIG. 1. The repeater function is further described in connection with the receive section shown in FIGS. 2 and 5.

An optional radix-conversion computer 32 may be employed herein to concentrate more users into the system with no degradation of service and with no substantial increase in the required bandwidth. It is to be appreciated that the user signal at the output of an MPP unit is in m-ary digital form and can be thought of in this form as a single digit number of radix m. A multiplace digital word of radix m is formed by assembling the individual digits of several MPP unit outputs. By converting to a higher radix this multi-place word will occupy fewer places, thus allowing more user signals to be multiplexed into the system. The radix conversion computer is discussed in more detail below in connection with FIGS. 2 and 10.

A central office terminal 33 provides a typical termination for a subscriber or toll multiplex (carrier) system. At this terminal, in addition to the voice signal processing circuitry, there is provided circuitry for handling supervisory signals such as "on-hook/off-hook", ringing, dialing and automatic number identification. No further discussion of this terminal is required inasmuch as the types of circuitry needed for voice signals would be identical to those at the user locations. Supervisory signal circuit requirements are not dealt with herein inasmuch as these are well known in the art.

Figure 2:
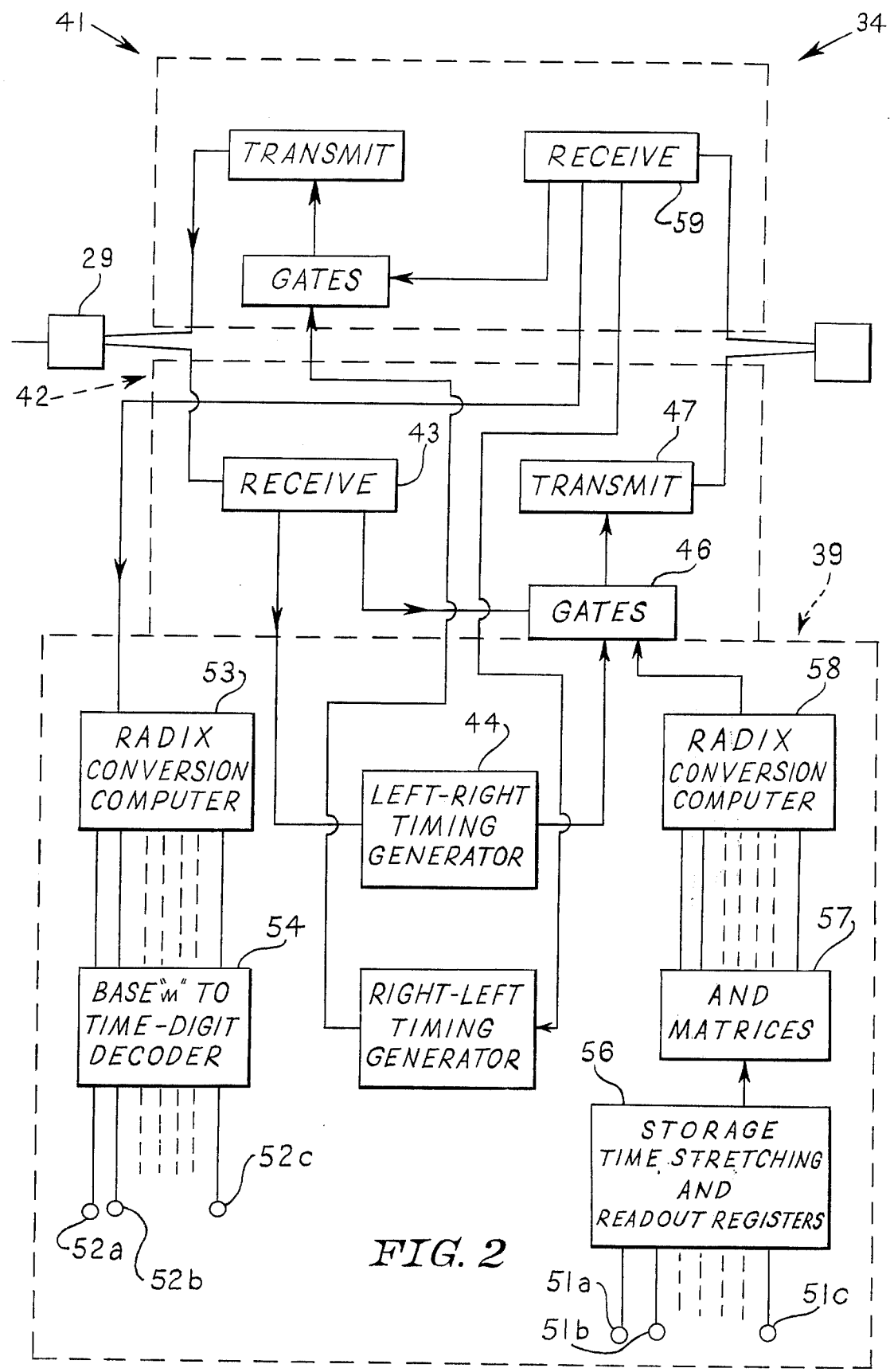
FIG. 2 is a block diagram of a receive-transmit unit and pulse processor of the present invention.

Referring now to FIG. 2, there will be seen to be illustrated a block diagram of circuitry included in a typical double RT 34 and pulse processor unit 39 of the system of FIG. 1. As mentioned above, two RT units or sections 41 and 42 are required in each module. Signals entering from the left from a regenerative repeater 29 are first detected by a receive unit 43 of section 42. A first output from the receive unit 43 is coupled to the input of a left-right timing generator 44 for synchronization of receiver phase detectors and retransmitting gates 46. A second output from the receive unit 43 contains the signal information to be retransmitted through these same gates. The output of the gates is applied to phase shifters of a transmit unit 47 for controlling the phase of the retransmitted carriers. Additional detail regarding the RT unit is described below in connection with FIG. 5 and FIG. 8.

Local users transmitting signals to the right in FIG. 2 provide sequential binary signals to typical input terminals 51a, 51b and 51c. Such binary signals are processed by a set of storage, time stretching, and readout registers 56. The concurrent outputs of these registers are applied to a set of AND matrices 57, each of which has a set of m output lines. Only one line of each set has a "true" condition during any given time frame. An optional radix conversion computer 58 may be employed to couple these matrix output lines to the transmit gates 46 of RT unit 42 and thereby place the processed signals from the local users onto the transmission medium in the right hand direction.

Input signals from the right of FIG. 2 enter RT unit 41 and are processed in a manner identical to that for RT unit 42 except that signals intended for reception by local users are taken off of the receive section 59 on a third output line and are decoded. If an optional radix conversion computer 53 is not employed, the input to pulse processor 39 from the receiver 59 actually consists of m lines per user. A decoder 54 converts the concurrent digital input to an equivalent binary output in sequential form which is the desired output form for the users and appears at typical output terminals 52a, 52b and 52c. Further processing would be needed in this example of telephone application in order to demodulate these signals into analog form at voice frequencies.

It is to be noted that only a single radix conversion computer need be provided to perform the functions of units 53 and 58 of FIG. 2 and this computer has a dual purpose in that it is used in both the left-to-right path (talking) and the right-to-left path (listening). This dual purpose is a conversion from a lower to a higher radix in the talk path and a reverse conversion in the listening path. As mentioned above this conversion allows an increased number of users on the system.

These separate conversions can be handled by a single "mini" computer operating on a time-sharing basis. Further discussion of this point will be found below in connection with FIG. 10.

Figure 3:
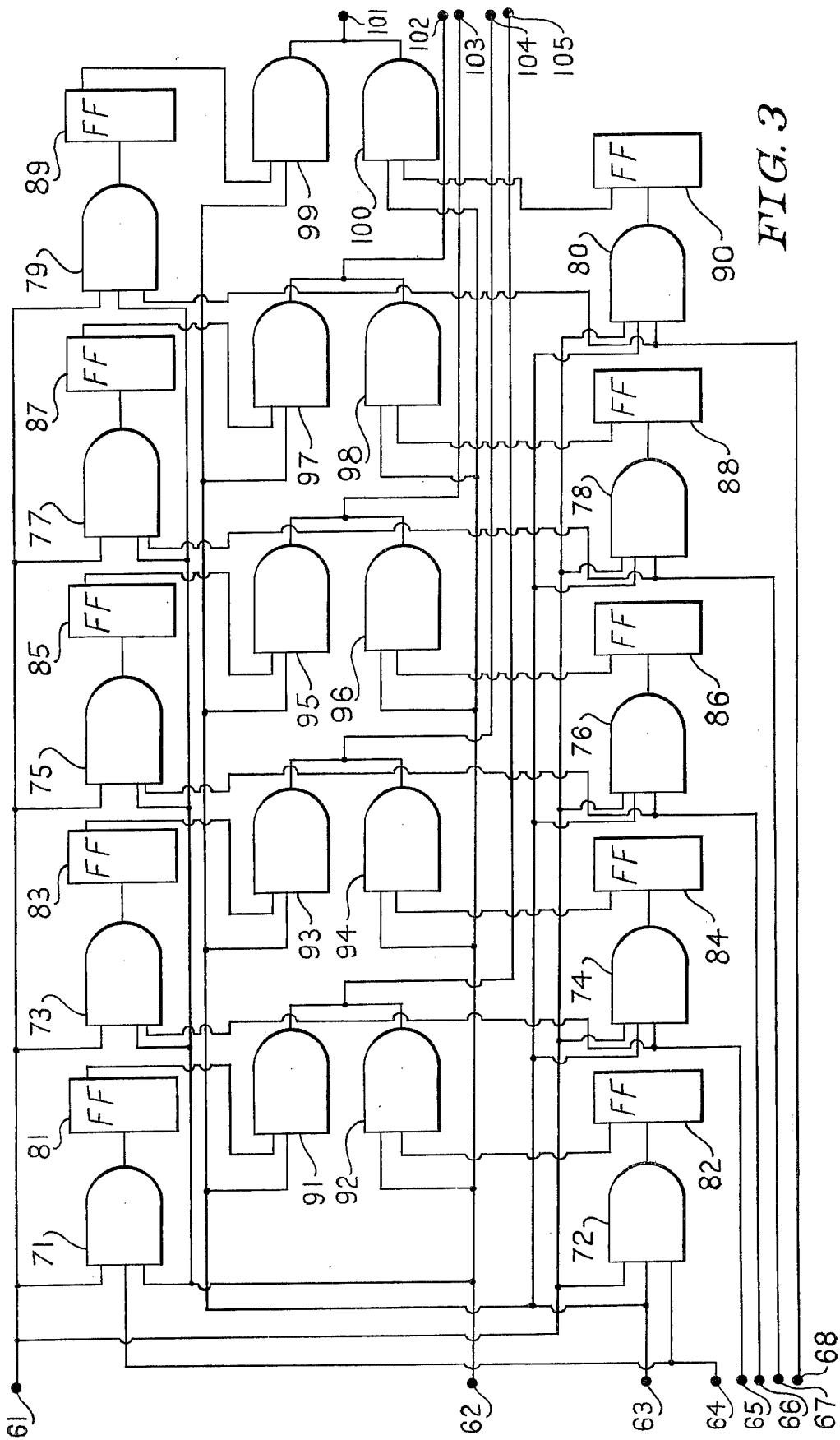
FIG. 3 is a circuit diagram of a storage, time-stretching and readout means of the present invention.

Reference is now made to FIG. 3 which further illustrates the storage, time-stretching and readout means 56 of FIG. 2 for handling five sample pulses per time frame ($q = 5$) for a single user. There is at present at input terminal 61 a binary bit stream from this single user source. As mentioned above, this source is not limited to, but can be taken to be, the output of a typical delta modulator, which modulator converts the user analog signals into digital (binary) form by using a sampling circuit. Such a sampling circuit samples the rate of change of voice signals at a rate which is substantially higher than the highest voice frequency to be transmitted. This sampling rate also becomes the rate of the binary bit stream that is applied to terminal 61. There is also applied alternate-frame signals at terminals 62 and 63 which are used to cause the registers to reverse roles from one frame to the next. Five timing pulses occurring sequentially and repeatedly in frames, are applied to terminals 64, 65, 66, 67 and 68 for use in gating each signal input pulse to a separate register for storage purposes.

Timing pulses for the circuit are provided by a timing generator such as generator 44 of FIG. 2 which receives a pilot carrier from a central office and contains dividers to produce required timing signals. For example, a 600Khz pilot carrier divided by 12 provides a 50 Khz early sample pulse and with a delay less than 1/50Khz provides a late sample pulse. Further division of the 50Khz signal by five provides a 10Khz frame rate and this divided by two provides alternate frame signals at terminals 62 and 63 of FIG. 3A. Sample pulses applied to a five-place shift register, resettable at the beginning of each frame, produce signals with the time intervals shown at terminals 64–68 of FIG. 3B.

Before proceeding with the description of the circuitry of FIG. 3, it is helpful to consider briefly the purpose of the storage, time-stretching and readout registers. As noted above, the short input pulse of each information bit period is stored throughout the entire time of the next frame and is thereby "stretched" for readout. Recalling that the term $q$ was also defined as an integer designating the number of information bits within a time frame, it will be seen that all q states are to be stored and later released from separate registers on separate output lines. This storage, time-stretching and readout provides for the subsequent concurrent assembly of bit patterns in an AND matrix. There are $m$ output lines for each user and a "true" condition signal is present on one of these lines for an entire time frame. There can be visualized a direct correspondence between a given pattern of the $q$ information bits and one "true" signal on one of the AND matrix output lines and another correspondence between the matrix line "true" signal and a specific phase-shifted carrier during a specific time slot. In other words, a single true signal represented by a given phase shift signifies that a certain information bit pattern had been applied to the system in a previous frame.

Returning once more to the description of the circuit of FIG. 3, the method and system by which individual bits of the binary bit stream at terminal 61 are directed to appropriate registers is now described. AND gates 71, 73, 75, 77 and 79 are enabled during an entire frame by a logic 1 present at terminal 62. In like manner, AND gates 72, 74, 76, 78 and 80 are enabled by a logic 1 at terminal 63. These enabling pulses at terminals 62 and 63 are always complementary, i.e., when terminal 62 is at logic 1, 63 is at a logic 0 and vice versa. Concurrently, within each frame, steering of individual bits to appropriate registers is accomplished by application of separate gate pulses occurring in five different bit intervals at terminals 64 through 68, which pulses cause the appropriate AND gate to be turned on in the proper sequence.

As an aid in visualizing the time relationship between the information bits and the register contents and readouts, reference is made to FIG. 3A. A typical example of an information bit sequence at terminal 61 is shown with frame A having the bit sequence 10110 and frame B having 01010. The combination of timing signals or pulses at terminals 62 through 68 steers each of these bit sequences into the appropriate set of registers, as shown in the Figure. In addition, there are shown waveforms 81' through 90' depicting the contents of registers 81 – 90 in time relationship with the input waveforms. To complete the picture, register readout waveforms (at the output of AND gates 91 – 100) are shown for three frames in FIG. 3B. The outputs during frame A are shown to be all zeros because it is assumed that the information bits during the frame just prior to frame A were all zeros.

Continuing now with the description of a preferred embodiment of the present invention, a typical AND matrix is shown in FIG. 4 wherein the signals at the output terminals 101 – 105 of FIG. 3 are applied to terminals 121 through 125, respectively, at the left of FIG. 4. The purpose of the AND matrix is to receive from the q readout output lines of the storage registers, the $2^q$ different binary combinations and to produce on m output lines one "true" output representing a particular binary combination present during a given frame. This matrix is, in itself, conventionally formed of diodes or gates 126 and will be seen to be supplied on the left thereof with connections from the register outputs, containing q lines, where in this case, $q = 5$. Each input 121 – 125 is directly connected to a separate matrix line and is connected through an associated logic inverter 121' – 125', respectively, to a second separate matrix line. An example of the operation by which a true state and signal is made up and applied to terminal 144 of FIG. 4 is now given as a typical AND matrix operation. Assume that five concurrent bits have states such that terminals 121, 123 and 125 are at logic 0 and terminals 122 and 124 are at logic 1 (+), such as in frame A' of FIG. 3B. Points 131 through 135 of FIG. 4 are taken as the AND gate inputs. The output at terminal 144 is taken as the AND output for that frame. Noting that the signals on lines from terminals 121, 123 and 125 are logically inverted, there is present on all of these AND inputs a logic 1 (+). From a typical AND truth table, when all inputs are positive, the output of the AND gate is positive and therefore the output at terminal 144 is positive for an entire frame. For review purposes it is noted that there is a direct correspondence between the concurrent binary states at the AND matrix input terminals and a single-place number with radix $m$, which number relates to the matrix output lines. The true signal on one line corresponds with a digit of this number, and there are m possible true signals representing $m$ different possible bit combinations of q bits applied to the matrix. The manner in which these $m$ lines are connected and the signals used in the remainder of the invention is given in a description of the transmit section below. It should be further noted that $m$ may be less than $2^q$ because certain bit patterns out of $2^q$ combinations may be sufficiently improbable so that it may not be necessary to provide output lines for every one of the combinations. For example, if $q = 5$, the combination 00100 from a delta modulator could be an improbable pattern because such a rapid change may not occur in band-limited speech.

In order to further clarify operation of the matrix illustrated in FIG. 4, reference is made to FIG. 4A illustrating the physical connections of diodes to the first vertical matrix column. The upper row of terminals 151 are connected to a positive power supply and through associated dropping resistors 152 to a first column line 153 that extends to the output terminal 141. It will be seen that, in the absence of further connections, a positive voltage appears at the output terminal 141 with respect to ground. The input terminals 121 to 125 are connected through associated inverter 121' to 125' and diodes 126 to the first column line 153. These diodes will conduct upon the application of a negative voltage to the left side thereof through the inverters 121' to 125'. Consequently, if it is assumed that a negative input pulse is applied to each of the input terminals 121 to 125, there will be seen to be applied a positive pulse to the left side of each of the diodes so that none conduct and consequently an output signal appears at terminal 141 for the binary word 00000. Any other combination of input signals, such as 01000, will prevent an output signal from appearing at terminal 141, for in this instance the inverter 122' would apply a negative pulse to the left side of the associated diode 126 so as to ground the column line 153. It is noted that the matrix comprises all possible or at least all desired combinations of diode connections from the one appearing at the left of FIG. 4 to the one appearing at the right of FIG. 4 so that any desired binary word may be employed to produce an output signal or true condition at a unique output terminal.

Figure 5:
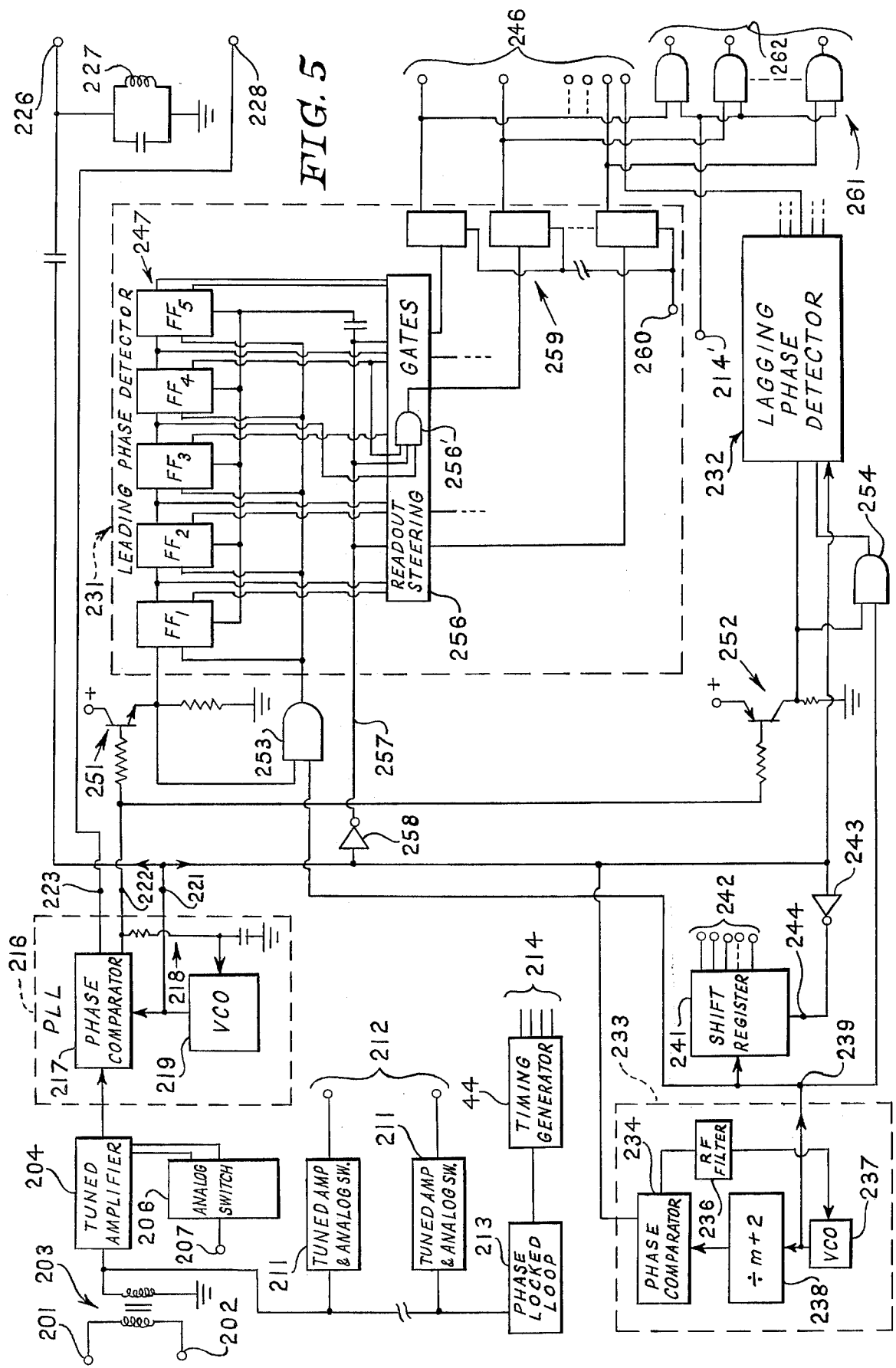
FIG. 5 is a block diagram of a receive section of a receive-transmit unit.

It will be appreciated that the receive and transmit sections of the present invention both operate upon signals received from the other and thus, purely as a matter of convenience, description is first made of a receive section as may be employed in the present invention. Referring to FIG. 5 there will be seen to be illustrated a receive section including both detection and timing circuitry employed to remove the information transmitted on the phase-shift carriers. It is first noted that the receive section accomplishes the following functions: (1) derivation from each receive carrier of a reference phase for use in the transmit section, (2) detection of the phase angle transmitted during each of the time slots in the time frame, and (3) derivation of synchronizing signals for use in both the receive and transmit sections. Inasmuch as the circuitry for each carrier frequency is identical, the following description is limited to one carrier frequency path. As shown in FIG. 5, input terminals 201 and 202 comprise a balancedline input connection receiving phase-shifted carriers which have been generated by other receive-transmit units and transmitted over an appropriate transmission medium to these terminals. The input terminals 201 and 202 are coupled by a transformer 203 to a tuned amplifier 204 having resonant tank circuits damped by an analog switch 206 so that oscillations occurring in one time slot do not continue into the next time slot. The analog switch 206 is controlled by a timing signal applied to an input terminal 207 from a transmit section. This timing signal which operates during the phase transition interval is generated in the transmit section, as described below. Separate tuned amplifiers and analog switches 211 are also supplied with the input signal for separate carriers and terminals 212 are shown to be connected thereto. The input signals at terminals 201 – 202 are also transformer coupled to a phase locked loop 213 having the output thereof applied to timing generators 44, as shown in FIG. 2. The timing signals from the generators 44, as further described below, appear at output terminals 214.

The output of the tuned amplifier 204 is applied to a phase-locked loop (PLL) 216 which comprises a phase comparator 217 having the output thereof coupled through an RC filter 218 to a voltage controlled oscillator (VCO) 219 that in turn has the output thereof applied back to the phase comparator. Phase-locked loops are well known in the art and may, for example, be comprised as a commercially available integrated circuit package such as RCA CD4046. The operation of phase-locked loops is well known in the art and consequently is not further described herein. It is, however, noted that there are provided three output terminals for the PLL 216, denominated in FIG. 5 as terminals 221, 222 and 223. Within the phase-locked loop the time constant of the RC filter 218 is made much longer than the period of a frame and is typically in excess of ten frames. Consequently the output of the VCO 219 is typically a square wave having a frequency equal to the carrier frequency and a phase that is a time average of the phase of the input to the phase-locked loop inasmuch as phase changes occurring during a frame have a minimal effect on the output of the VCO which is connected to terminal 221 and may be designated as a zero-degree reference phase. Terminal 221 is capacitively coupled to an output terminal 226 of the receive unit with a tuned circuit 227 connected thereto for removing all higher frequency components present in the square wave to thus form a sinusoidal carrier of reference phase for retransmission in the transmit section.

Attention is invited to the nature of the signal appearing at output terminal 222 inasmuch as this signal serves as the basis for phase detection in the remainder of the circuitry hereof. If the input signal from amplifier 204 has a leading phase compared to the reference signal at terminal 221, there will appear at terminal 222 a signal which typically has a rectangular shape (a logic 1) with the leading edge occurring at the instant the input signal crosses the threshold in one direction and with the trailing edge occurring at the instant the zero phase of the reference signal crosses a similar threshold. In the case of a lagging phase the crossover roles of the two signals are reversed so that the signal of the zero reference phase controls the leading edge of the rectangular output pulse and the input signal controls the trailing edge. However, the polarity of the output signal for lagging phase is opposite to that of a leading phase (a logic 0 level). When the input signal has a zero phase the output impedance of phase comparator 217 is very high (typically $10^{10}$ ohms) which is significant in the operation of coupling transistors described below. There is thus produced at terminal 222 a waveform whose time duration is directly proportional to the phase difference between the input and reference signals of the phase-locked loop. An additional output from PLL 216 appears at the output terminal 223 and is employed for the purpose of signalling a transmit section of a phase change in the carrier. At least certain phase-locked loops, such as the commercial unit identified above, employ a plurality of flip-flop circuits wherein one of same has a first logic state during the time that there is a zero phase difference between the receive carrier and the VCO output and an opposite logic state at all times that the receive carrier is a phase difference from the VCO output. Thus, at terminal 223 there is provided a first logic state at all times the receive carrier is not phase-shifted and this output switches to the opposite logic state during the entire time that the receive carrier is phase-shifted, i.e., as any phase value other than zero degrees. The terminal 223 is connected to an output terminal 228 of the receive section for utilization in the transmit section as a control signal to enable the transmitter output to be shifted from zero degree reference to some other discrete phase value.

Phase detection of the receive carrier in the receive section of FIG. 5 is accomplished by a leading phase detector circuit 231 and a lagging phase detector circuit 232. These circuits are identical and thus only details of the leading phase detector 231 are illustrated in FIG. 5. The phase detector circuits operate by counting a sequence of high frequency timing or clock pulses which are herein generated by a phase-locked loop 233 having the input thereof connected to terminal 221 of PLL 216. This phase-locked loop 233 is conventional in incorporating a phase comparator 234 coupled through an RF filter 236 to a voltage controlled oscillator 237 that is in turn coupled back to the phase comparator. However, in this phase-locked loop there is preferably incorporated between the output of the VCO and input of the phase comparator a circuit dividing the frequency by $m+2$ so that the ultimate output of the VCO is set at $m+2$ times the carrier frequency and this output appears at an output terminal 239. The output of PLL 233 appearing at terminal 239 has a frequency which is $m+2$ times the carrier frequency and, recalling that $m$ is the number of discrete phase values possible, there will thus be seen to be provided two guard time intervals so that in each given time slot there is produced $m+2$ timing or clock pulses for use in the phase detector circuits 231 and 232. These clock pulses at terminal 239 are also applied to a shift register 241 producing timing pulses at output terminals 242 for use with other carrier channels. The shift register 241 is reset by connection of the reference phase signal from terminal 221 of PLL 216 through an inverter 243 to the shift register 241. It is noted in this respect that input carrier signals at terminals 201 and 202 contain identification of separate frame signals as, for example, by a forward shifting in one frame and backward shifting in the next frame so that the timing generator 44 is reset for each frame.

The phase detection process of the present invention comprises converting the time duration of the rectangular waveform at terminal 222 into a true condition on one of m output lines at terminals 246 of FIG. 5. This "true" condition then represents one of the m discrete phase values received in a given time slot. The above-noted conversion is herein accomplished by employing the rectangular pulse at terminal 222 as a variable time gate signal for controlling a plurality of shift registers 247 in the leading phase detector 231 and like shift registers in the lagging phase detector 232 for counting a sequence of high frequency clock pulses produced by PLL 233 at the output terminal 239 thereof. The waveform or signal at terminal 222 has an average value above ground level and is therefore not appropriate for direct application of the input of typical digital logic circuits. In order to provide for an appropriate direct coupled interface between terminal 222 and the circuitry of the phase detectors 231 and 232, there are provided coupling transistors 251 and 252. Considering the transistor 251, it is noted that same is an NPN transistor with a positive voltage connected to the collector thereof, the base coupled through a resistor to terminal 222 and the emitter connected to the input of the leading phase detector 231 and grounded through a resistor. In the phase comparator 217 a leading phase of input signals thereto produces a positive-going pulse which will be seen to turn on the NPN transistor 251. Transistor 251. Transistor 252 is a PNP transistor with the emitter thereof connected to a positive voltage terminal and the collector connected to the input of the lagging phase detector 232 so that a negative-going pulse at terminal 222, which is the result of a lagging phase input to the phase comparator, turns on the PNP transistor 252. It is to be particularly noted that neither of the transistors 251 nor 252 conducts when the input phase is zero inasmuch as the high impedance state of the terminal 222 under this condition prevents such conduction.

Inasmuch as the leading and lagging phase detectors 231 and 232 are alike and operate the same except upon input signals of opposite polarity, it is only necessary to consider further the operation of the leading phase detector, for example. The variable time gate signal appearing at the emitter of transistor 251 is employed for two purposes with the first of these being to enable the shift registers 242 to count the number of high frequency clock pulses generated by the timing source or PLL 233 during the period of the gate pulse. The second purpose of the variable time gate signal is to enable an AND gate 253 having one input connected to the clock pulse terminal 239 and the other input to the emitter of transistor 251 in order to controllably pass the clock pulses to the shift registers. Another AND gate 254 is similarly connected to the lagging phase detector 232.

The registers 247 of phase detector 231, herein denominated as $FF_1$ to $FF_5$, are connected to a plurality of readout and steering AND gates 256 which are schematically illustrated in FIG. 5 to show all connections of only the third AND gate 256'. These readout and steering gates 256 are inhibited during alternate half-cycles of the carrier frequency by a signal appearing on an inhibit line 257 connected through an inverter 258 to terminal 221 and also connected to the registers 247. Thus the AND gates 256 are inhibited during the time the registers are counting clock pulses during one half-cycle of the reference carrier signal and are enabled for readout of register contents during the following half-cycle of the reference carrier signal. The inhibit line 257 is also connected through a capacitor 255 to apply to the registers 247 an edge triggered reset signal at the beginning of each count interval. In the illustration of FIG. 5 the upper output of $FF_1$, for example, is considered to be the Q output and the lower output is considered to be the $\overline{Q}$ output. The complementary lines of sequential pairs of registers are connected to each of $m/2$ steering AND gates in order logically to read out the register contents and create a true condition on the appropriate steering gate output line. For example, assume that during a given time slot the RF carrier has been phase shifted by an amount corresponding to three clock pulse intervals, and assume further that the carrier frequency is such that eight countable cycles occur within the time slot. In this example three clock pulses will be counted and stored in shift registers $FF_1$, $FF_2$ and $FF_3$ during the first half of each RF cycle. At the beginning of the next cycle the shift registers are reset to zero to begin a new count. This process can be repeated up to as many as eight times, once for each of the countable RF cycles. The Q outputs of shift registers $FF_1$, $FF_2$ and $FF_3$ will be at logic 1 and the Q outputs of $FF_4$ and $FF_5$ will be at logic 0 at the end of each RF cycle counting interval. The AND steering gate No. 1 will be inhibited because this gate input from the complement ($\overline{Q}$) of $FF_2$ is at logic 0. Similarly gates 2, 4 and 5 are inhibited because of input logic 0 conditions; however, a logic 1 exists on all inputs to gate 3, thereby producing the only logic 1 output of that RF cycle which represents the true condition mentioned above.

The outputs of the readout-steering AND gates 256 are applied to a counting circuit 259 which is programmed to produce an output pulse after a given number of like phase-shifted cycles have been received. This counter 259 is adjusted to count a predetermined number of true conditions in a given time slot and to only produce a signal on an output terminal 246 after such number of counts with such counts occurring each half-cycle of reference carrier signal so that a measure of noise immunity is built in to the detection system. The registers of counter 259 are also supplied with FT Matrix time slot signals from a timing generator 44, such as illustrated in FIG. 2, and a terminal 260 is shown to be connected to the counting circuit. The probability that a noise burst stored in one of the registers might produce an unwanted true condition at an output terminal 246 is thus reduced to a very low value.

The receive section of the present invention as illustrated in FIG. 5 and described above, is noted to perform the two functions previously stated. The function of regenerative repeater is accomplished by connecting terminals 246 to a transmit section for immediate retransmission. The other function, that of detecting phase shifts for the local user, is accomplished by a plurality of AND gates 261 having inputs connected to the terminals 246 and gating pulses applied thereto from the timing generator 44 as indicated at terminal 214' corresponding to the output terminals of generator 44. There are m gate output terminals 262 and upon one of these there will appear a "true" condition that is gated out during the time slot assigned to that local user. It will be appreciated that additional local users may be assigned to this frequency at different time slots; however, this would require an additional set of output gates for each user similar to those at terminals 262.

It will be appreciated that the lagging phase detector 232 operates in the same manner as the leading phase detector and consequently that a plurality of output terminals 246 are provided therefor. Such terminals are appropriately connected to AND gates for applying true conditions to selected terminals 262 in the appropriate time slot for a local user.

Figure 6:
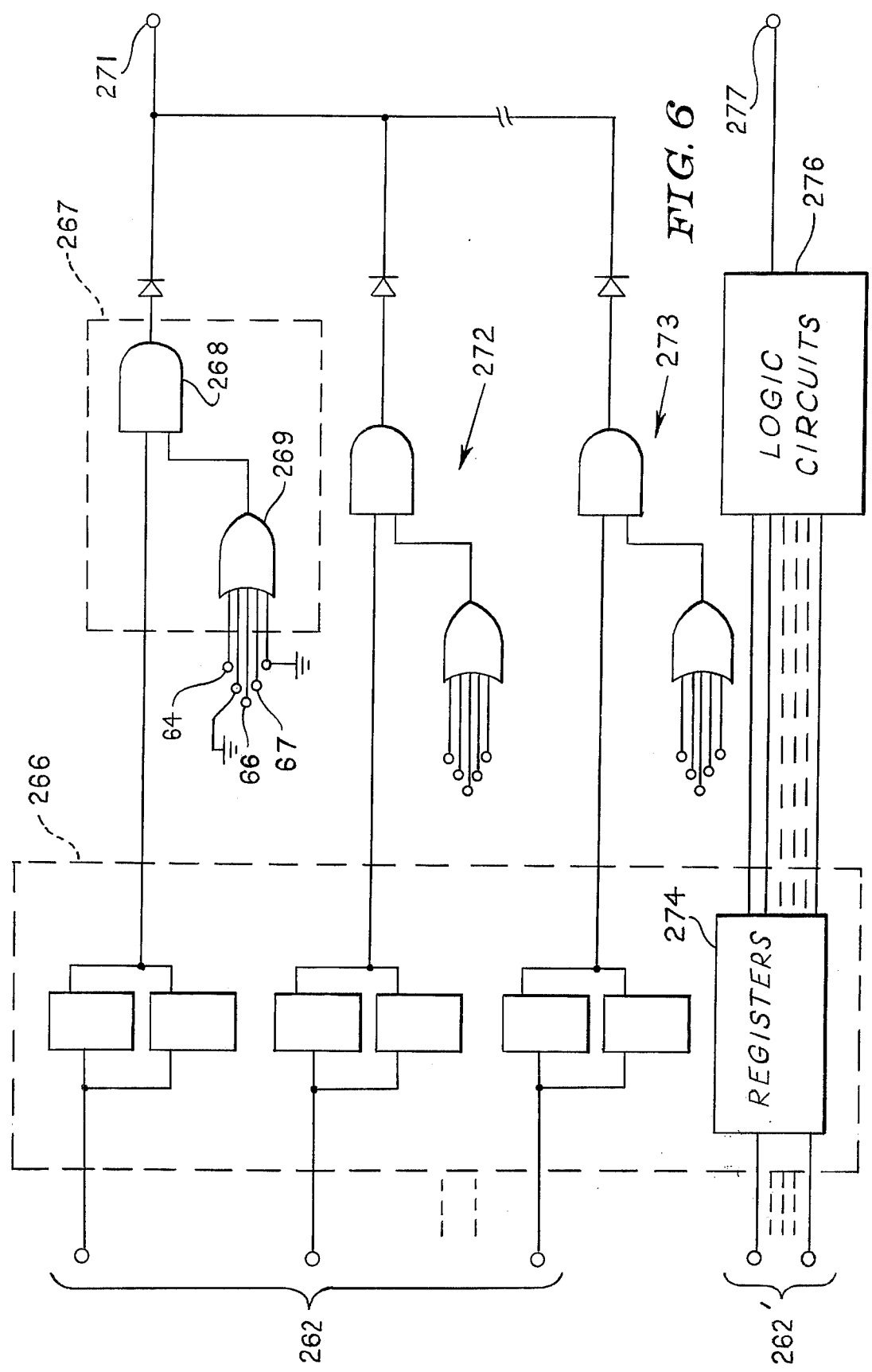
FIG. 6 is a block diagram of conversion circuitry employed in the present invention.

It will be appreciated that the signals appearing at terminals 246 must be converted into a corresponding binary bit sequence for local users and this may be accomplished by circuitry such as illustrated in FIG. 6. Referring to FIG. 6 there will be seen to be shown at the left thereof terminals 262 corresponding to like number terminals in FIG. 5. The true condition in pulse form on one of the m lines connected to terminals 262 in FIG. 6 are stored, stretched, and read out in a manner similar to that of the registers of FIG. 3 and this is herein accomplished by a set of registers 266. In common with the function described in connection with FIG. 3, the outputs of individual registers are retained during an entire time frame after the one in which the pulse is received. Conversion of this output into an appropriate bit sequence takes place in one of a plurality of logic circuits such as the one illustrated at 267. One true output from the registers 266 is applied, for example, to logic circuit 267 as one input of an AND gate 268 thereof, with the other input being supplied as the output of an OR gate 269 thereof. Inputs to the OR gate 269 are the positive pulses occurring in each of the q intervals which require a logic 1 level in order to reconstruct the particular bit sequence represented by the corresponding true condition. Each of the logic circuits, such as 267 in FIG. 6, are wired to generate a predetermined word upon occurrence of a true condition on the input line thereof from registers 266. Thus, for example, to reconstruct a sequence of five logic 1 bits in a frame, the input terminals of OR gate 269 would be separately connected to the terminals 64 to 68 inclusive of FIG. 3A. The source of signals at these terminals 64 to 68 is a timing generator 44, as described elsewhere herein. As an example, consider that the binary word transmitted in Frame B of FIG. 3B has been received and is to be read out as $10110_2$. This readout will be made by logic circuit 267 with a true condition applied to the AND gate 268 with the OR gate inputs connected as shown in FIG. 6. This will apply a logic 1 during the first time slot to OR gate 269 and a logic 1 at both inputs of AND gate 268 and a logic 1 at the output thereof so that a logic 1 appears at terminal 271. Inasmuch as the second and last digits are to be logic 0 the second and fifth input terminals of OR gate 269 may be tied to ground as shown to produce logic 0 at terminal 271. The output of AND gate 268 is coupled through a diode to an output terminal 271 and similarly the outputs of additional logic circuits 272, 273 and the like, connected through registers to separate input terminals 246 are coupled to this output terminal 271. Each of these logic circuits is wired to reconstruct a different word. There will thus appear at output terminal 271 the binary bit sequence for an individual user. Additional users assigned to remaining available time slots in the frequency-time matrix have like conversion circuitry as indicated by the registers 274 having input terminals 262' and coupled to logic circuits 276 for applying a bit sequence at a single output terminal 277 for each user.

Figure 7:
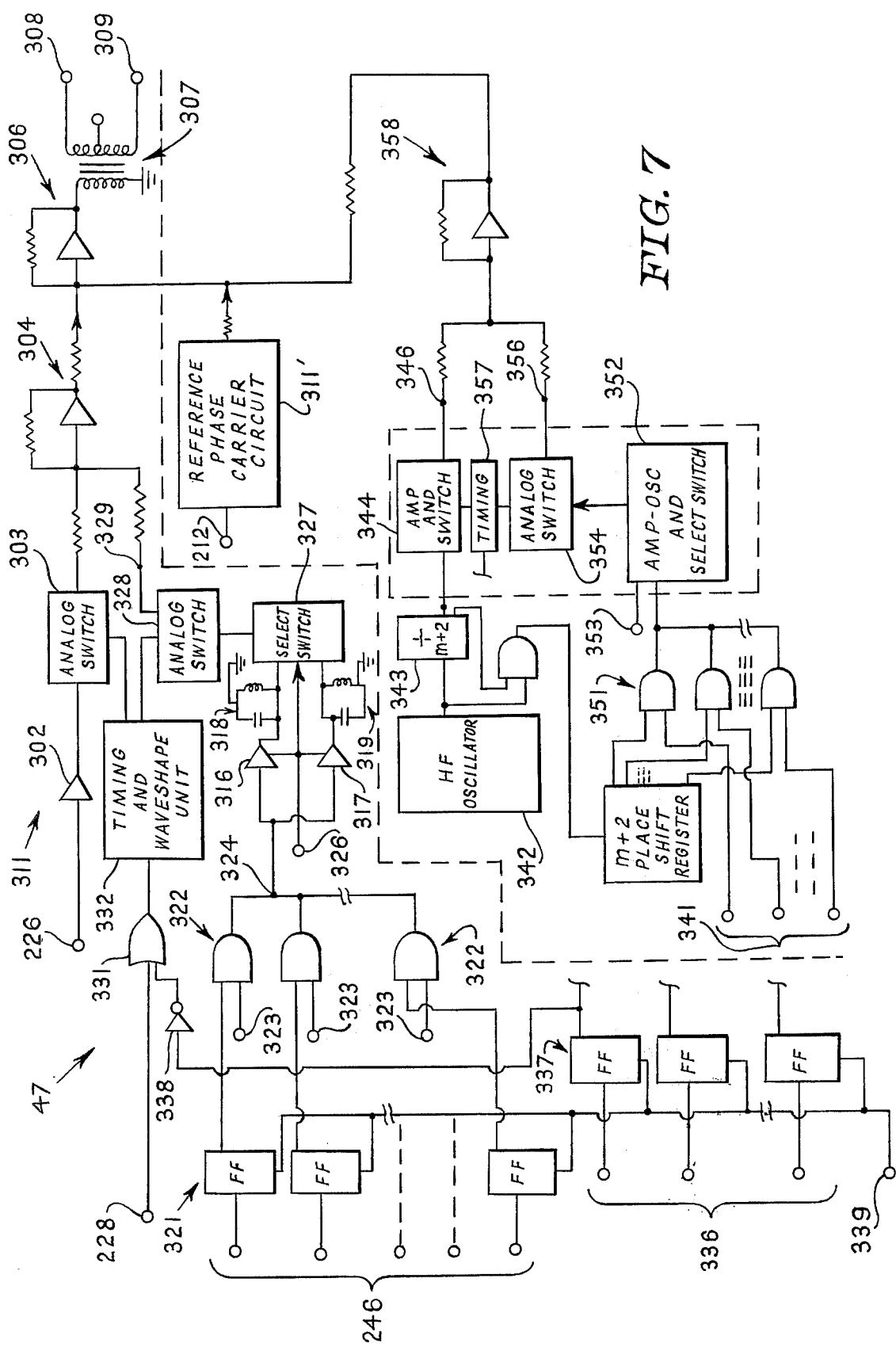
FIG. 7 is a block diagram of the transmit section of a receive-transmit unit of the present invention.

Considering now the transmit section of the receive-transmit unit 47 of the present invention, reference is made to FIG. 7 wherein terminal 226 corresponds to the like numbered terminal in the receive section of FIG. 5. This terminal 226 receives the reference phase carrier which is applied through an amplifier 302 to an analog switch 303 which has the output thereof resistively coupled to an operational amplifier 304. As illustrated in FIG. 7, the output of the amplifier 304 is resistively coupled to another operational amplifier 306 which, in turn, has the output thereof coupled through a transformer 307 to balanced line terminals 308 and 309. With the analog switch passing signals there will thus be applied the reference phase carrier to the output terminals 308 and 309. The circuitry between the input terminal 226 and the input to operational amplifier 306 may be termed a reference phase carrier circuit 311 and a similar circuit 311' is shown to be connected between an input terminal 212 corresponding to another carrier terminal in FIG. 5 and the input of operational amplifier 306 for another carrier frequency.

Considering now the generation of phase shifted signals for transmission it is first noted that such may be accomplished by the utilization of controlled class-C amplifiers and tank circuits or by the utilization of switches and tank circuits. In FIG. 7 there are illustrated a pair of amplifiers 316 and 317 having the outputs connected to associated tank circuits 318 and 319 respectively. These amplifiers 316 and 317 have the biases thereof adjusted to operate class-C so as to ring their respective tank circuits at the desired carrier frequency. Input signals for the amplifiers are obtained from terminals 246 of the receive section and thus carry the information in pulse form that is to be retransmitted. The pulses at 246 are stored in master flip-flop circuits 321 so that the short pulses received last through the following time slot for conversion back into appropriate values of phase shift. Outputs of the flip-flop circuits 321 are applied to AND circuits 322 and each of these AND circuits have a separate input terminal 323 connected to one of the terminals 242 of the shift register 241 in the receive section. Consequently it will be seen that the AND circuits 322 successively receive timing signals at one input thereof during each half-cycle of RF carrier and when the true condition stored in one of the flip-flops is coincident with the timing pulse at one of the AND circuits a gate pulse is produced at a common output terminal 324 of the AND circuits 322. Terminal 324 is connected to the inputs of the amplifiers 316 and 317. These two amplifiers also receive a timing square wave at one-half the repetition rate of the time slots that each amplifier is alternately operated in alternate time slots. The timing signals are supplied to a terminal 326 that is connected to the amplifiers 316 and 317 for alternately energizing or enabling same and this timing signal may be obtained from a timing generator of FIG. 2. The purpose of this alternate operation of the amplifiers 316 and 317 is to provide ample time for one tank circuit to establish oscillation in its proper phase while oscillation in the other tank circuit is being dampened. The timing terminal 326 is also connected to and controls a selector switch 327 which is connected to the tank circuits 318 and 319 for switching the output of the switch from one to the other in response to the timing signal. The output of the selector switch 327 is supplied to an analog switch 328 which in turn has the output at a terminal 329 thereof resistively coupled to the input of the operational amplifier 304 in the reference phase carrier line 311. The analog switches 303 and 328 are enabled or switched on and off by the phase change signal at terminal 228 of FIG. 5. This terminal is shown in FIG. 7 to be connected through an OR circuit 331 to a timing and waveshape unit 332 which generates complementary signals to control switching of the analog switches 303 and 328. It will be recalled that the signal applied to terminal 228 in FIG. 5 is a signal indicating a phase change and this then is employed in the transmit section of FIG. 7 to operate the timing and waveshape unit 332 in order to turn off the analog switch 303 and turn on the analog switch 328. The signal at terminal 228 goes to a logic zero, for example, upon the initiation of and existence of a phase difference from reference phase and returns to logic one when these phases are again equal, and thus it will be seen that the analog switches 303 and 328 are operated to pass to the output terminals 308 and 309 either the zero phase-shifted carrier or the phase shift carrier.

It will be appreciated that, in the event some of the time slots of carriers already present are not occupied, local user signals which have passed through pulse processing units may be inserted in the transmit section, as for example, at terminals 336, which are connected into the circuit through associated flip-flops 337 in the same manner as terminals 246. The connection is also made from the flip-flop circuit 337 whereat a true condition occurs with a zero phase reference carrier through an inverter 338 to an input of the OR circuit 331. There is also provided a time slot reset terminal 339 connected to each of the flip-flop circuits 321 and 337 in order that all flip-flops or registers will be cleared or reset at the end of each time slot. Timing signals applied to reset terminal 339 may, for example, be obtained from a timing generator 44. In general, a system frame signal produced by a timing generator and RF carrier at the central office, for example, may be employed to transmit synchronizing signals throughout the system to each receive-transmit unit. Such a signal is then employed to operate time slot bit interval and pulse-shaping circuit timing generators at the appropriate times. Inasmuch as timing circuits are well known in the art, no further description thereof is included herein.

The above-described portions of FIG. 7 will be appreciated to relate to a single carrier and, of course, additional carriers may be inserted in the line to accommodate additional local users. In this respect reference is made to the portion of FIG. 7 below and to the right of the dashed line extending across the Figure.

The additional circuitry illustrated in FIG. 7 provides for the injection of a new RF carrier for either present or further address assignments of up to $p$ time slots per carrier in the FT matrix. The terminals 341 are adapted to be connected to $m$ input lines permitting the application of a local modulator pulse processor and associated flip-flop circuits thereto. An internally generated carrier is provided by a stable, high-frequency oscillator 342 which has the output thereof applied to a frequency divider 343, for dividing by $m+2$ and applying the output thereof through an amplifier and analog switch 344, similar to the circuit 302 and 303 described above, to terminal 346. The input terminals 341 are connected to AND circuits 351 with the other inputs of each AND circuit being connected to an $(m+2)$ place shift register actuated by an AND circuit connected to the high-frequency oscillator 342 and frequency divider 343. The outputs of the AND circuits 351 are applied to a phase shift circuit 352 which may, for example, be the same as the circuit including amplifiers 316 and 317 with their associated tank circuits and selector switch 327 described above. A timing terminal 353 applies a square wave at ½ the repetition rate of the time slots to the phase shifter, so that the output thereof applied to an analog switch 354 is, in fact, the phase-shifted carrier that is applied to an output terminal 356. A timing and waveshape circuit 357 operates the switches 344 and 354 in the manner previously described. Terminals 346 and 356 are resistively coupled through an operational amplifier 358 to the input of the operational amplifier 306 for application to the balanced line output terminals 308 - 309.

Considering the transmit section somewhat further, it is noted that the analog switches 303 and 328 affect the change-over in carrier phase; however, the manner in which this change-over is accomplished is worthy of further note. It is known that an abrupt transistion in any signal requires a wide frequency spectrum for a faithful reproduction of that signal. Band width considerations of the present invention preclude such a wide frequency spectrum and consequently it is desirable, if not necessary, to make carrier transitions from one phase to another as gradually as possible. There is herein provided a compromise to allow for this gradual change and still provide an adequate time period in each time slot for the reliable detection of the desired phase by the receiver. A number of prior art methods are available for producing the waveshape of the complementary control signals fed to the analog switches from the timing and waveshape circuits 332. Consequently, no further description thereof is included herein. It is herein provided that the two different phases of the carriers shall overlap during the transition interval, thereby decreasing the required band width for the system. The advantages of overlapped pulses are discussed by Prabhu and Rowe in an article entitled "Spectrum of Digital Phase Modulation by Matrix Methods" appearing in the Bell System Technical Journal, Vol, 53, page 899 (May-June 1974). Overlapping of the two different phases of the carrier is herein accomplished by the utilization of a special timing and waveshape circuit or unit 332 which allows for the initiation of the transition control waveshape prior to the beginning of a time slot. Such circuitry may derive its synchronization from a reference timing signal for the system as a whole by the use of delay lines, timing multivibrators, or counting circuits which are triggered by the preceding time slot. In view of this wide variety of conventional means available, no further elaboration thereof is included. It is, however, noted that frame synchronization for the system of the present invention is required and may be readily accomplished by such means as the transmission of a pilot signal that carries the frame timing information. At each receive-transmit unit a delay in the retransmission of the frame timing signal can be provided for to allow for the transition overlap interval noted above.

Considering further the timing of the present invention, particularly as regards the transmits section illustrated in FIG. 7, it is noted that timing pulses required in the transmit section are derived from the shift register 241 of FIG. 5. The high frequency pulse train produced by the circuit 233 of FIG. 5 at terminal 239 is applied as an input to the shift register 241 and this high frequency pulse train has a frequency that is ($m+2$) times greater than that of the reference carrier, and has one of the high frequency pulses thereof occurring precisely at the time the reference carrier goes through a zero degree crossing. It has been noted that the timing pulses for the transmit section are produced by the shift register 241 of the receive section, and it is further noted that the timing relationship between the shift register output pulses and the phase-shifted carrier is controlled in such a way that each phase of the carrier to be retransmitted may be selected in the transmit section by utilizing the shift register output lines, with each of $m$ such lines assigned to have a direct correspondence with a specific discrete phase value assigned to the carrier. In order to initiate the shift register output pulses in the proper order, a reset pulse from PLL terminal 221 of the receive section is applied to reset terminal 244 to start shift register operation so that, for example, the first output line thereof always has a pulse that is closest to the $-180°$ point of the reference carrier, which could be assigned as the most leading phase value for the carrier to be retransmitted. The term ($m+2$) was chosen for use in this illustration so that there would be no conflict in time with respect to the $-180°$ and the $+180°$ points of the reference carrier. In other words, neither of these two phase values has a correspondence with any of the $m$ phase values. If other than these phase values were to be excluded from the $m$ values, the term ($m+2$) would have to be changed, causing a different phase lock frequency to be generated by the VCO 237 of the circuit 233. Such excluded values could be used for control functions or the like as, for example, to provide supervisory signals in a telephone company application. It is noted that any variation in the number of overall phase values to be retransmitted must be related to the maximum number of coded representations that are to be sent by $m$ combinations, as further discussed below.

Figures 8, 8A:
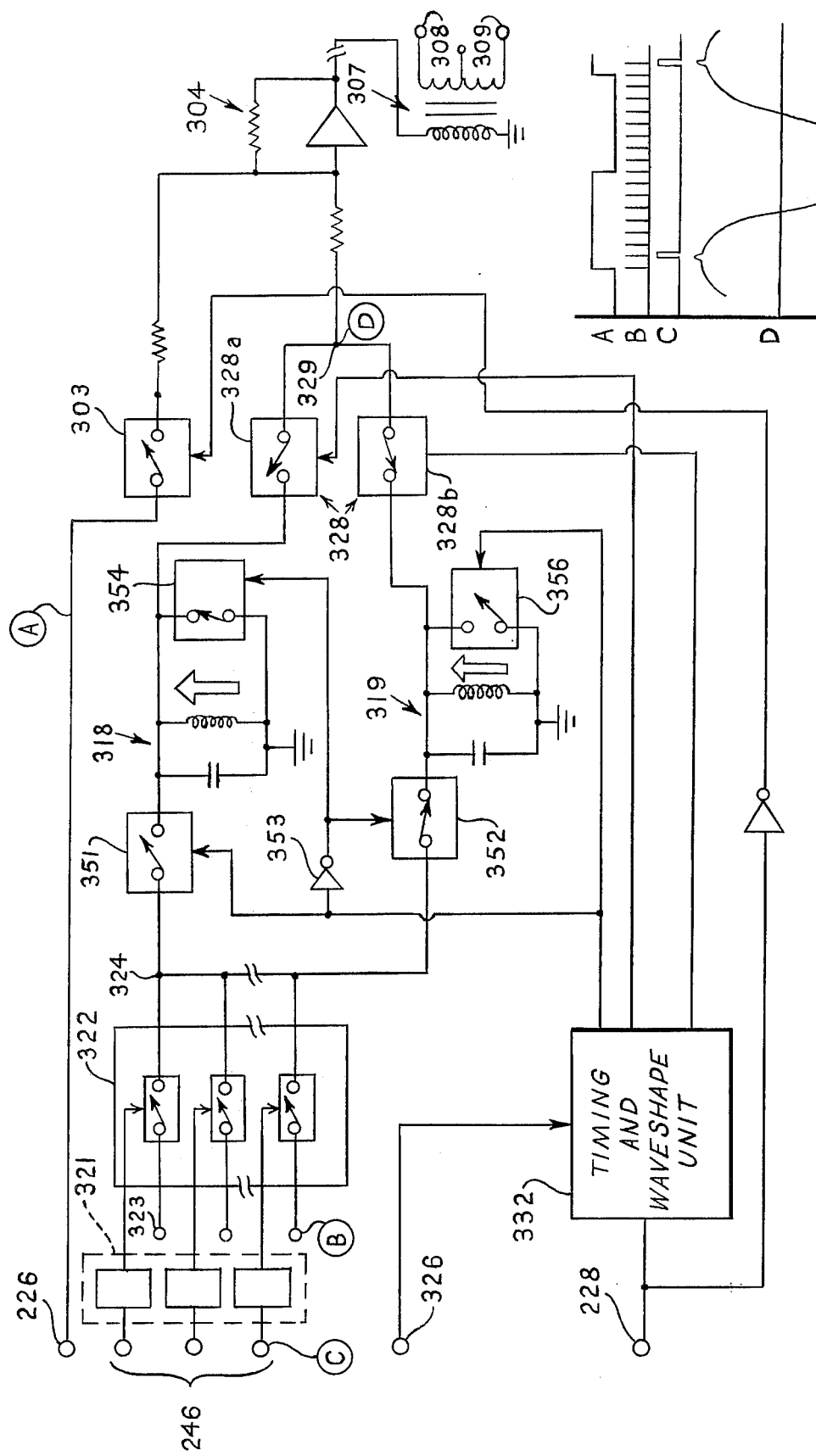
FIG. 8 is a schematic illustration of a simplified transmit section employed for purposes of describing operation thereof.
FIG. 8A is an illustration of wave shapes occurring at identified portions of the circuit of FIG. 8.

Operation of the transmit section may be best understood by considering a simplified version thereof, such as illustrated in FIG. 8, wherein simple controlled switches are employed as functional units. Referring now to FIG. 8 for a description of operation, it is noted that high frequency pulses appear sequentially at terminals 323 with such pulses being generated at shift register terminals 242 of the receive section. Each of the analog switches of FIG. 8 may be comprised of such devices as P channel MOS or N channel MOS transistors or integrated circuits such as, for example, CD 4016 manufactured by RCA, which includes four CMOS analog switches per unit. The flip-flops 321 may comprise J-K registers and when one of these $m$ registers is at a logic 1 level, a train of eight high frequency pulses is passed through the associated analog switch 322. Each of these pulses arrives on a dedicated line at each of the input switches and repeatedly occurs once per RF cycle at a time position related to a discrete phase value, as described above. To generate a given RF carrier phase shift during a given time slot, the time position of the corresponding high frequency pulse, as gated by the JK register 321, is passed through the appropriate analog switch 322 to the inputs of switches 351 or 352. These switches are alternately operated on opposite half phases of the RF carrier to ring the tank circuits 318 and 319 and thereby produce a corresponding phase-shifted sine wave. For example, if the pulse at terminal 323 is a representation of the most leading phase value of $m$ phase values, and this pulse is selected in the given time slot, the pulse would appear repeatedly at the RF carrier rate in this most leading phase position of each carrier cycle. The switches 351 and 352 are alternately operated at one-half the repetition rate of the time slots by a signal appearing at terminal 326 which in FIG. 8 is illustrated to be applied through the timing and waveshape unit 332, although this is not necessary. This signal is applied directly to control switch 351 and through an inverter 353 to control switch 352. Each of the tank circuits 318 and 319 is damped and this is shown to be accomplished by the provision of switches 354 and 356 connected across the tank circuits 318 and 319, respectively. Switch 354 is operated in a manner complementary to switch 351, i.e., the control signal is applied to switch 354 through the inverter 353 and likewise the damping switch 356 is operated in a manner complementary to switch 352 by applying the control signal directly to switch 356. Thus it will be seen that, with switch 351, for example, open as illustrated, switch 354 will be closed to damp oscillations in the tank circuit 318, while on the other hand, with switch 352 closed, damping switch 356 will be open so that the oscillations generated in the tank circuit 319 may pass therefrom. The analog switch 328 of the transmit section is illustrated in FIG. 8 as comprising a pair of complementary operated switches 328a and 328b. These latter switches are operated by the timing square-wave appearing at input terminal 326 and may be applied through the timing and waveshape unit 332. In the foregoing example wherein switch 352 is closed and damping switch 356 is open, the selector switch 328b would be closed and the selector switch 328a would be open. In this example, the high frequency oscillation from tank circuit 319 would be applied through the operational amplifier 304 to the output terminals 308 – 309. The analog switch 303 is shown in FIG. 8 in the same manner as in FIG. 7, connecting the input terminal 226 with the output terminals 308 – 309 and being operated by the phase shift signal appearing at terminal 228, either by connection through the timing and waveshape unit 332, as illustrated in FIG. 7, or by direct connection through an inverter to the switch 303.

In FIG. 8A there are illustrated waveshapes of signals appearing at different locations in the transmit section of FIG. 8, and it is first noted that waveshape A is a square-wave RF carrier. It will be appreciated that this is a simplification inasmuch as the RF carrier is actually sinusoidal. However, with this simplification it is possible to employ the analog switches of FIG. 8 rather than the amplifiers of FIG. 7 for ease of description. The pulses appearing at B of FIG. 8A represent the high frequency pulses applied to terminals 323 in sequence thereof, and the gate pulses at C of FIG. 8A are those applied to input terminals 246 of FIG. 8. These gate pulses are employed as described above to produce a sinusoidal waveform D at an output terminal 329 of the analog switch 328.

It will be seen that the transmit section operates to "spike" alternate tank circuits during alternate time slots, and with these tank circuits tuned to the same RF carrier frequency there is provided or produced the desired phase-shifted carrier. The alternate operation of these tank circuits permits the energization and de-energization of the tanks for producing sine waves in a controlled manner. Inasmuch as the band width of each RF carrier is affected by the manner in which the control signals from the timing and waveshape circuits are formed, the shape of these signals is also controlled. It has been found that, with a constant pulse energy and a controlled Q of the tank circuits, the sine wave can be made to come up to full useful amplitude in the time of two RF cycles and is then constant in amplitude and phase during the remainder of the time slot. Since in the illustrated version of the present invention there is no complex circuitry to affect this energy or Q, the phase angles are quite repeatable, typically to within one or 2°. It is noted in this respect that the limit to $m$ is the number of phase shifts that can be reliably detected during each RF cycle. If a more elaborate course and fine phasing scheme were employed, as known in the art, the value of $m$ can be increased to a higher number, thereby increasing the information content of each time slot with no significant change in band width. The expense of added circuitry might, for example, be offset by available revenues from increased information per band width that could be transmitted over particular toll transmission paths. More elaborate phase selection may, for example, be realized by raising the RF carrier to a higher frequency where the transmission medium allows same, and the injection of a subcarrier. Such a subcarrier can be phase-shifted to one of a given number of phase values to pick off a set of segments of time and in each selected segment the RF carrier can be phase-shifted to one of another set of values, thereby providing both a course of a fine set of values for increasing the value of $m$ wherein $m$ is again employed to express a total number of possible phase values in each time slot. In the illustrated example, $m$ has been chosen as 12 with 5 leading and 5 lagging phases and 2 guard phases as noted above; however, it will be appreciated from the foregoing that this value of $m$ is only herein taken for purposes of illustration and is in no way limiting.

Figure 9:
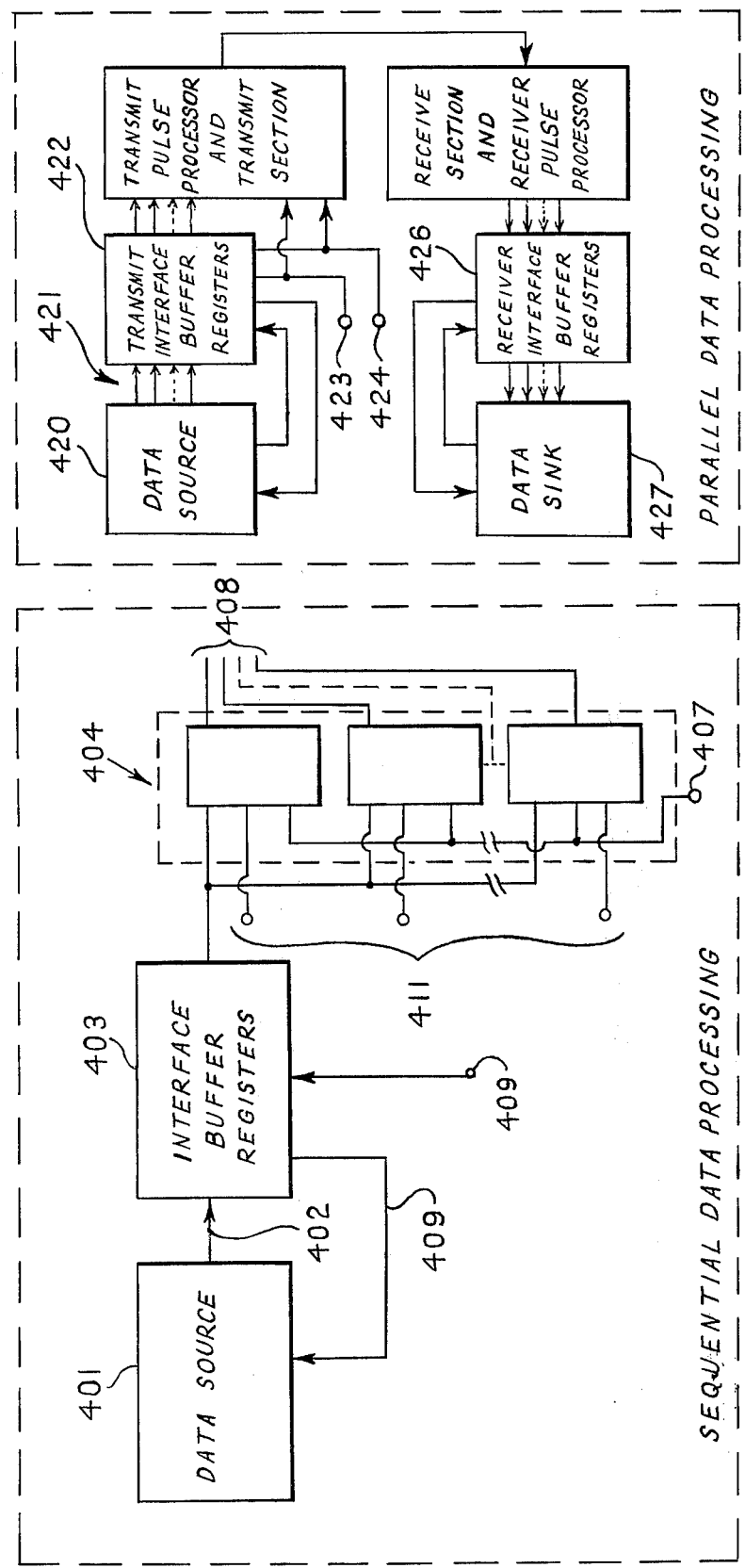
FIG. 9A is a block diagram of a sequential data processing unit as may be employed in the present invention.
FIG. 9B is a block diagram of a parallel data processing unit as may be employed in the present invention.

The system of the present invention is adapted to the transmission of information and, although the foregoing description has been primarily directed to voice transmission, no limitation is intended thereby, for the invention is equally applicable to data transmission. Data may be provided from a source such as a computer or memory bank in either sequential or parallel form and in FIG. 9A there is illustrated sequential data processing in accordance with the present invention and in FIG. 9B parallel data processing in accordance with this invention. Referring now to FIG. 9A there will be seen to be generally illustrated a data source 401 producing at an output terminal 402 a series or sequential train of digital bits representing data to be transmitted. It will be appreciated that the clock rate of this digital train may not necessarily be the same as the sampling rate or frame rate of the present invention. Consequently there is provided interface buffer registers 403 providing for $q$ bits to be stored in each time frame of the present system. The interface buffer registers incorporate flip-flop circuits and associated logic control circuits and may be formed in a conventional manner in order to apply data signals from the source 401 to input registers 404 such as the storage, time-stretching and readout registers 56 of FIG. 2. At terminal 406 there is applied a signal having an early sample clock rate which is applied to the buffer registers 403 in order to reset the registers at such early sample rate. At terminal 407 there is applied a signal having a late sample clock rate which is the same rate as the early sample clock rate but delayed long enough to permit entry of all information from the buffer registers into the registers 404 before operating these latter registers to apply the output thereof upon lines 408, which are connected to matrices 57 of FIG. 2. The interface buffer registers 403 generate a "buffer ready" command signal which is applied through line 409 to the data source 401. With the data source clock rate being slower than the clock rate of the present system, the buffer circuit 403 merely stores the data source information until cleared by the early sample clock at 406 at which time the data source is again enabled to transmit to the buffer circuitry. If, on the other hand, the data source clock rate is greater than the clock rate of the present system, the signal on line 409 is employed to intermittently terminate or inhibit the transmission of data to the buffer circuit. With data applied to the system at 408, the remainder of the system performs identical pulse processing as described above when a delta modulator provides sequential data thereto, including the fact that the receiver output terminal has present the desired sequence occurring at the sampling rate. It is noted that timing signals, such as those appearing at terminals 62 to 68 of FIG. 3, are applied to the registers 404 at the terminals 411 of FIG. 9A and it is also noted that, if the sampling rate of the system of the present invention is either too fast or too slow for the data sink to which the data is to be applied, a similar buffer register would be required at the receiver end of the system in order to perform the same function in reverse as that of the buffer circuit 403 in the transmit path.

It is recognized that a user's data source may transmit or provide data in either a sequential or parallel manner and in FIG. 9B there is shown a system in accordance with the present invention for transmitting data from a parallel data source 420, wherein each output line 421 is weighted according to the bit value in the digital word which is present in all the lines. The number of lines for a user is not necessarily limited to $q$ unless the data transmission is to be used in place of the voice-input data. It is noted, in both sequential and parallel data processing, that either a modulator or the buffer registers of FIGS. 9A and 9B may be employed with an address assignment of one user per time slot in the FT matrix, thus simplifying the description and facilitating understanding of the system. The parallel output lines 421 from the data source 420 are connected to the input of transmit interface buffer registers 422 that, in turn, apply signals to the transmit pulse processor and transmit section of the present invention. It is noted that, for parallel input of data, the storage, time-stretching and readout registers 56 of the present invention require separate input lines for each data bit and consequently require a gating-in time signal and gates to permit entry of the parallel data in each frame. To this end there are shown terminals 423 and 424 which are connected to appropriate timing sources and otherwise the system of the present invention as described above processes the data in the same manner as that of a modulator, except at the receiver output. Instead of regenerating a serial bit stream, parallel receiver interface buffer registers 426 are provided in order to apply the data to a data sink 427 in desired form.

The present invention has a significant advantage for data transmission over present telephone data sets which transmit data over voice lines in the passband of 200 to 3,000 Hz. One advantage lies in a much higher bit rate of transmission possible with the present invention. In this connection consider an example of the present invention employing a subscriber multiplex system (carrier system) with voice being transmitted in each channel in the above-noted band width. Telephone company data sets typically send computer data via tones at a rate of 1.2k bits/second. In the foregoing example of the present invention as a telephone subscriber carrier system and the interfacing units described above, the data rate or bit rate $F_D$ that can be handled in each voice channel with no interference in adjacent channels is: $F_D = q.f_f$, where $q$ is the number of bits or pulses per frame and $f_f$ is the frame rate. In one embodiment of the present invention wherein $q = 4$ and $f_f = 12.5$ kHz, it will be seen that 50k bits/second transmission rate is obtained over a single voice channel. This comprises a marked improvement over the above-noted 1.2k bits/second presently available with telephone data sets. It is additionally noted that the toll data error rate as presently set for commercial data transmission over telephone company lines is 2 bits/minute which is very substantially in excess of the error rate of the present invention. Attempts are presently being made by others in the field to increase the possible rate of data transmission and in this respect conventional PCM systems are being converted for use in high speed data transmission; however, the error rate has been found to be almost prohibitive for many, if not most, computer users and adjustment of these systems for best results causes adjacent channel interference and consequent loss of use of some channels. In this respect it is noted that a PCM system receiver searches or looks in the noise for the single occurrence of each bit whereas the receiver of the present invention utilizes the multiple event decision feature hereof to choose the correct data state and reject recurring noise that occurs in a smaller number of multiple events. Consequently the present invention provides a major advancement in minimization of errors in data transmission.

Figure 10:
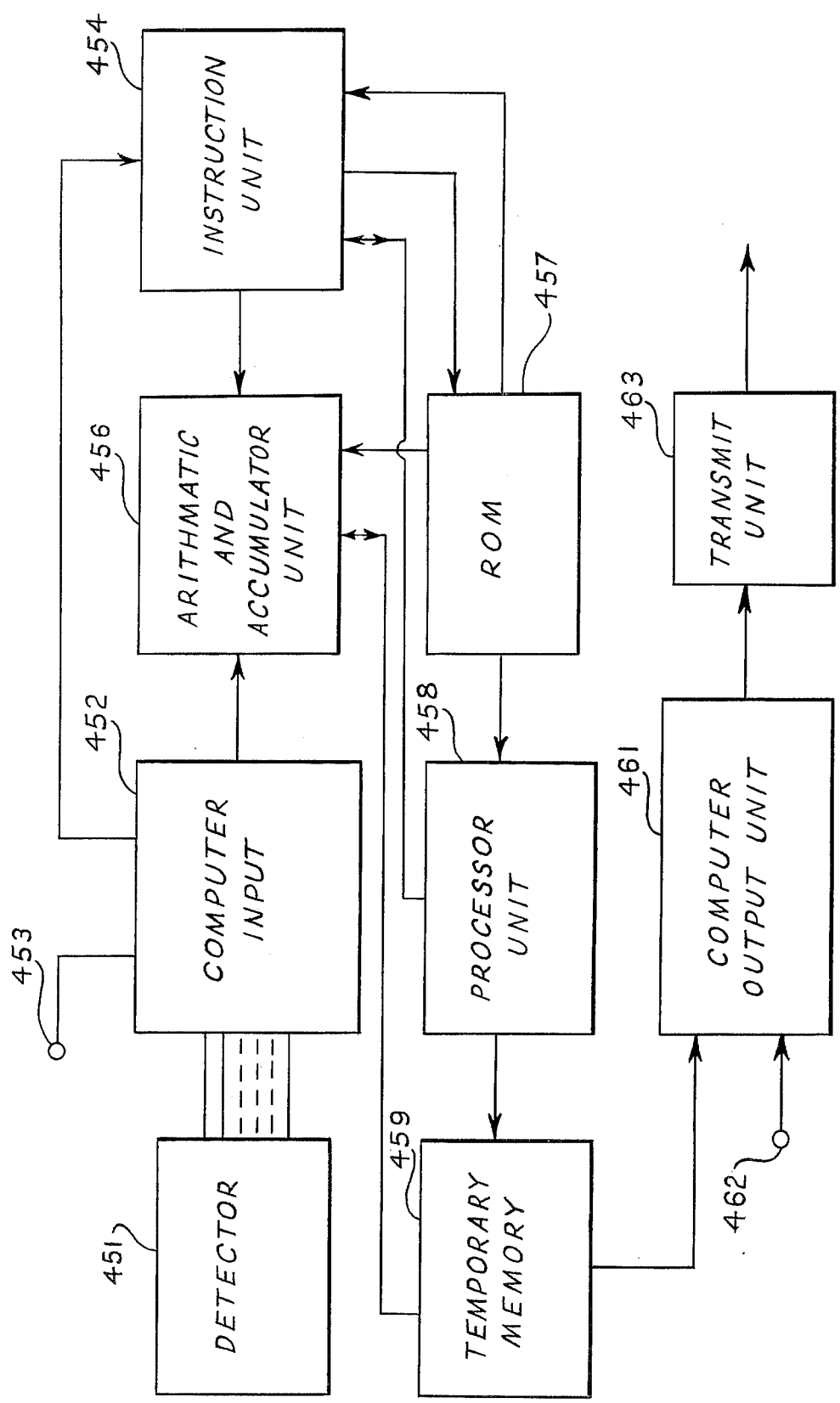
FIG. 10 is a block diagram of a radix conversion computer as employed in the circuit of FIG. 2.

There has been briefly noted above and identified in certain of the drawings such as FIG. 2, radix conversion computers 53 and 58 which may be employed with the present invention to increase the amount of information that may be sent over the transmission medium by the present invention. A radix conversion computer suitable for usage in the present invention is shown in FIG. 10. Referring to FIG. 10 there will be seen to be provided a detector 451 applying signals to a computer unit 452 that includes a base $m$-to-binary conversion and buffer registers operating in a parallel mode. A computer clock pulse is applied to the computer unit at terminal 453 and the computer output is applied to an instruction unit 454 and to an arithmetic and accumulator unit 456. The instruction unit 454 is connected to a read only memory (ROM) 457 storing the program employed by the radix conversion computer and the instruction unit is also connected to the arithmetic and accumulator unit and to a processor unit 458. The instruction unit receives a signal to take the first step of the program and interrogates the read only memory 457 to obtain instructions for this step to the arithmetic and accumulator unit 456 and to the processor unit. The processor unit identifies the step as having been performed and the results of the step are applied to a temporary memory 459. The output of the temporary memory 459 is connected to a computer output unit 461 which also receives transmit timing signals at a terminal 462. The computer output unit is connected to a transmit unit 463, such as illustrated in FIGS. 7 or 8 hereof.

It is noted that the radix conversion computer of FIGURE 10 employs two memory sections wherein the read only memory section is used to permanently store processing instructions necessary for directing the computer to make the radix conversion via arithmetic operations. The temporary memory section is utilized to store partial solutions resulting from the various conversion steps. These stored partial solutions are first written or inputted into memory and then transferred out allowing the storage to be cleared and made available for subsequent inputs. In the foregoing manner the present invention precludes the requirement of expensive memory sections such as core memories or the like.

As stated previously in the descriptions of FIGS. 1 and 2, the purpose of the radix conversion computer is to provide, on an optional basis, the means whereby more users can be concentrated into the system with no degradation of service and with no substantial increase in the required bandwidth. When the system is filled up with the maximum number of users that can be handled using base $m$, as described above (FIGS. 1 through 8), the conversion to a higher base R, requiring R different phase values, enables more information to be sent in the same FT matrix. At the receive input, such as the receiver at the central office of a telephone system, a reverse conversion from R back to $m$ would be required. In the transmit direction, the higher-radix conversion is made by applying to the input unit the base $m$ digits from AND matrices such as in FIG. 4 wherein a temporary storage of these digits in buffer registers enables a subsequent "call-up" by the computer at the computer clock rate. After the higher-radix solution has been made in the computer, the final solution is stored in the output unit for use by the transmit section of the system at the normal frame rate. The solution steps to be made are discussed below; however, since the functional sections, suggested by the remaining units of the computer in block form in FIG. 10, are known in the art, there is no further discussion of these herein. In the receive section essentially the reverse operation is performed.

For reduction of program steps and thus simplification of the computer, it is highly desirable to choose a base $m$ and a base R that are related by a factor of a power of 2. The following formulae illustrate the solution steps that could be programmed into the computer for an R and $m$ relationship of two. First the number equation for a number arranged according to the ordered digit positions for both base $m$ and R is given.

$$N_R = D_0 R^0 + D_1 R^1 + D_2 R^2 + D_3 R^3 + \ldots \quad D\text{'s in base } R$$

$$N_m = d_0 m^0 + d_1 m^1 + d_2 m^2 + d_3 m^3 + \ldots \quad m\text{'s in base } m$$

Conversion upward ($m$ to R), let $m = \dfrac{R}{2}$ $$N_m = d_0 \left(\frac{R}{2}\right)^0 + d_1 \left(\frac{R}{2}\right)^1 + d_2 \left(\frac{R}{2}\right)^2 + d_3 \left(\frac{R}{2}\right)^3 + \ldots$$

$$= d_0 \times 1 + \frac{d_1}{2} R^1 + \frac{d_2}{2^2} R^2 + \frac{d_3}{3^3} R^3 + \ldots$$

Conversion downward (R to $m$), $$N_R = D_0 (2m)^0 + D_1 (2m)^1 + D_2 (2m)^2 + D_3 (2m)^3 + \ldots$$

$$= D_0 \times 1 + 2D_1 m^1 + 2^2 D_2 m^2 + 2^3 D_3 m^3 + \ldots$$

Example:

$1 \; 1 \; 4 \; 4 \; 2_5 \quad$ convert to base 10

$$N_5 = 2 + 4 \times 5^1 + 4 \times 5^2 + 1 \times 5^3 + 1 \times 5^4$$

$$= 2 + \frac{4}{2} \times 10_{10} + \frac{4}{2^2} \times 100 + \frac{1}{2^3} \times 1000 + \frac{1}{2^4} \times 10000$$

$$= 2 + 20 + 100 + 125 + 625 = 872_{10}$$

To convert back again, $\quad 872_{10} = 2 + 7 \times 10 + 8 \times 100$ $$= 2 + 14 \times 5^1 + 32 \times 5^2 \quad \text{(base 10)}$$

$$= 2 + 24 \times 10_5 + 112 \times 100_5 \quad \text{(base 5)}$$

$$= 2 + 240 + 11200 = 11442_5$$

It will be appreciated that the above-described communication system employs FT matrix in such a way that there is achieved a significant advantage in the art. Through the use of phase-shifted RF carriers, each hole of the matrix is caused to convey more information than it could if only RF bursts were used. In this respect, it is of interest to note certain significant factors which influence system performance. The first of these factors is the consideration of the number of users that can be accommodated by a given FT matrix. The size of the matrix is specified in terms of the number of holes in it, represented by the symbol H, which is equal to the product of the number of separate RF carriers and the number of time slots in the time frame. If the number of users is represented by the symbol S, the relationship between H and S is found to be $$S \leq H \frac{\log R}{\log m} \qquad (1)$$

This relationship shows that when R is greater than $m$, the number of users can be made larger than the number of holes in the matrix. The maximum value of R for a given system is governed by the shortest time interval, $\tau$, which can be handled by the circuitry in the phase-shift detector and the highest carrier frequency used in the system, $f_{cm}$, as shown by the following formula:

$$R + 1 \leq \frac{1}{\tau f_{cm}}$$

The 1 is added to R in the above formula for the same reason described in the discussion of the phase-shift detector, namely, to provide for guard intervals at the beginning and end of a carrier cycle.

A second factor is the need for keeping the radix conversion process as simple as possible. Since the arithmetic would normally be carried out by converting all numerical values to binary form, it would be advantageous to have both the radix $m$ and the radix R as powers of 2. If $R = 2m$ then the quantity $$1 + \frac{\log 2}{\log m}$$

represents the factor by which S is greater than H and shows further that $m$ should be kept as small as possible in order to realize the maximum benefit from the radix conversion feature.

A third factor is the consideration of the minimum number of samples of a phase-shifted carrier that can be reliably detected by the high-speed digital phase detector described above in connection with FIG. 5. As indicated in that description the presence of noise on the phase shifted carrier will result in spurious coincidence pulses being passed on to some of the counters. In order to prevent these pulses from being registered as true values of the detected phase shift it is desirable to have as many correct coincidence pulses as possible passed on to the appropriate counter. The worst situation prevails at the lowest carrier frequently, $f_{cl}$, where the number of correct pulses would be the smallest because the number of cycles of the signal is smallest. If j is the minimum number of correct detector output pulses that must be received in order to reduce detector errors to an acceptable level, the lowest carrier frequency that should be used is given by $$f_{cl} = p \cdot g \cdot j \cdot f_f$$

where
 $p$ = number of time slots in a time frame.
 $g$ = ratio of time slot to phase detection interval.
 $f_f$ = frame rate.

There has been described above a preferred embodiment of an improved communications system employing time and phase shift division multiplexing which materially extends the capabilities of communications systems to transmit a maximum amount of information over a communication medium of limited bandwidth. The invention is advantageous in the general field of voice communication by telephone, for example, and is also highly advantageous for data transmission at extremely high speeds or high bit rate. Although the invention has been described with respect to a single preferred embodiment thereof, it is not intended to limit the invention to the details of illustration or particular terms of description, for it will be apparent to those skilled in the art that numerous modifications and variations are possible within the scope of the present invention.

What is claimed is:

1. A frequency-time division multiplexing communication system comprising:

a transmitter adapted to receive input signals for transmission and including means establishing successive time frames within each of which the inputs are sampled numerous times to produce binary pulse trains for each frame and phase shift means operated by said binary pulse trains to phase shift predetermined carrier signals at predetermined times in each frame in accordance with the information per frame, a transmission medium connected to the output of said transmitter for transmitting said phase-shifted carriers, and a receiver connected to said transmission medium and including means detecting each carrier phase shift and counting the number of phase-shifted cycles of each carrier in each frame to only identify the phase shift information upon counting of a predetermined number of phase-shifted cycles per frame to minimize noise errors, and means reconstructing the input to said transmitter from said phase shift information.

2. The system of claim 1 wherein the input is an analog waveform further comprised by said transmitter comprising a pair of tank circuits tuned to oscillate at the frequency of a carrier, means alternately energizing said tank circuits with information in said binary pulse train to thus alternately generate phase-shifted carrier signals, and switch means alternately applying said phase-shifted carrier signals to said transmission medium.

3. The system of claim 1 further defined by said receiver comprising:

a phase-locked loop connected to receive signals from said transmission medium and producing from signals thereon the original carrier without phase shift for retransmission, leading and lagging phase detectors including registers and gate circuits for detecting leading and lagging phase-shifted input carriers, counting means connected to said registers and gate circuits for counting the number of phase-shifted carrier cycles, and logic circuits connected to said counting circuits and to a source of timing signals for reconstructing said binary pulse train.

4. The system of claim 3 further defined by a demodulator receiving said binary pulse train and producing an analog waveform therefrom.

5. The system of claim 1 further defined by said receiver having input registers connected to a source of timing signals, interface buffer registers connected to said input registers and adapted for connection to a data source producing a train of digital bits, and means applying an early sample clock signal to said buffer registers for clearing same and a late sample clock signal slightly delayed from the early sample clock signal to said input registers to clear same after the buffer register information is stored therein.

6. A communication system comprising a transmitter including sampling means adapted to receive input signals and to sample such signals a plurality of times in each of successive time frames and producing binary pulse trains for each time frame, and phase-shifting means operated by said binary pulse trains for phase-shifting predetermined carrier signals of different frequency at predetermined times in each frame in accordance with the information of said binary pulse trains;

a transmission medium connected to the output of said transmitter for transmitting said phase-shifted carriers; and a receiver connected to said transmission medium and including means for detecting the phase shift of individual cycles of separate carriers and discriminating against noise signals, and means reconstructing the input to said transmitter from said detected carrier phase shifts at predetermined times.

* * * * *